United States Patent
Maul et al.

(10) Patent No.: US 8,854,936 B1
(45) Date of Patent: *Oct. 7, 2014

(54) AUTOMATIC FORWARD SENSE CALIBRATION FOR WRITING SYSTEMS

(71) Applicant: Marvell International Ltd., Hamilton (BM)

(72) Inventors: Gary Christopher Maul, Limburg (NL); Tom Geukens, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/030,380

(22) Filed: Sep. 18, 2013

Related U.S. Application Data

(63) Continuation of application No. 12/690,542, filed on Jan. 20, 2010, now Pat. No. 8,553,513.

(60) Provisional application No. 61/147,616, filed on Jan. 27, 2009, provisional application No. 61/254,237, filed on Oct. 23, 2009.

(51) Int. Cl.
  *G11B 7/12* (2012.01)
  *G11B 7/0045* (2006.01)

(52) U.S. Cl.
  CPC .................... *G11B 7/00456* (2013.01)
  USPC ............... 369/47.51; 369/47.53; 369/53.26; 369/59.11; 369/59.19; 369/59.21; 369/116

(58) Field of Classification Search
  None
  See application file for complete search history.

(56) References Cited

U.S. PATENT DOCUMENTS

| | | |
|---|---|---|
| 8,553,513 B1 * | 10/2013 | Maul et al. ............. 369/59.21 |
| 2002/0191519 A1 | 12/2002 | Fukuzawa et al. |
| 2003/0227841 A1 | 12/2003 | Tateishi et al. |
| 2004/0233814 A1 | 11/2004 | Nishimura et al. |
| 2005/0097292 A1 | 5/2005 | Kim |
| 2009/0175145 A1 | 7/2009 | McCormack |

* cited by examiner

*Primary Examiner* — Wayne Young
*Assistant Examiner* — Brian Butcher

(57) ABSTRACT

Embodiments of optical disc drives are described that perform automatic forward sense calibration of write laser power using a sample and hold sampling strategy that is automatically determined based on an automatically selected write strategy. Embodiments of the described optical disc drive may be dynamically configured to support any optical disc media, any write mode, and any write strategy. The write strategies supported may include dynamically changing write speeds and/or write power levels across the respective optical media tracks. As the optical drive is automatically configured for a selected write media/write mode/write strategy, the sample and hold sampling delays used to control the sampling of a forward sense feedback signal are also automatically configured, thereby allowing each forward sense sampling point to be aligned with an area of the forward sense feedback signal that corresponds to a power level of interest and that avoids distortion in the feedback signal.

20 Claims, 22 Drawing Sheets

CASTLE WAVEFORM

AUTOMATIC FORWARD SENSE CALIBRATION FOR WRITING SYSTEMS

INCORPORATION BY REFERENCE

This application is a continuation of U.S. application Ser. No. 12/690,542, filed on Jan. 20, 2010, now issued as U.S. Pat. No. 8,553,513, which claims priority under 35 U.S.C. §119(e) to U.S. Provisional Application No. 61/147,616, filed on Jan. 27, 2009, and U.S. Provisional Application No. 61/254,237, filed on Oct. 23, 2009. The disclosures of the applications referenced above are incorporated herein by reference in their entireties.

BACKGROUND

The irradiation power of a laser diode can change for a variety of reasons, such as deterioration of the laser diode over time and/or changes in the internal temperature of the laser diode due to use and/or changes in the temperature of the operating environment of the circuit in which the laser diode is included. Therefore, the irradiation power of a laser beam emitted from a write/read laser optics module of an optical disc drive during an optical media write process is closely monitored, and adjusted when necessary, to maintain the laser irradiation power at intended levels. Generally, laser diode irradiation power is monitored using a light sensitive diode, such as a front monitor diode, or forward sensor.

A laser diode can be monitored by sampling an analog signal produced by the light sensitive diode in response to a portion of the light emitted from the laser diode. However, such an analog monitoring signal will include delays and distortions that make it difficult to determine proper times at which to sample the analog monitoring signal in order to obtain accurate feedback for a specific write power level. The task is further complicated by the fact that some of the delays and distortions that affect the analog monitoring signal are synchronous in nature, i.e., change based on the clock speed at which data is written by the diode laser, while other delays and distortions are asynchronous in nature, i.e., change based on one or more analog physical response characteristics of the electronic components in response to changes in the write speed and write power of the laser diode.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

Example embodiments of optical disc drives are described that perform automatic forward sense calibration of write laser power using a sample and hold sampling strategy that is automatically determined based on an automatically selected write strategy. Embodiments of the described optical disc drive may be dynamically configured to support any optical disc media, e.g., HD DVD, Blu-Ray, etc., any write mode (e.g., 1×, 6×, 32×, etc.), and any write strategy. The write strategies supported may include dynamically changing write speeds and/or write power levels across the respective optical media tracks. As the optical drive is automatically configured for a selected write media/write mode/write strategy, the sample and hold sampling delays used to control the sampling of a forward sense feedback signal are also automatically configured. In this manner, forward sense sampling points are aligned with areas of the forward sense feedback signal that correspond to power levels of interest, and forward sense sampling points are prevented from being aligned with areas of the forward sense feedback signal that suffer from distortion.

In one example embodiment, an optical disc drive is described that includes an encoder module configured to generate encoded run-length data, a strategy module configured to generate write strategy data based on the encoded run-length data, the write strategy data including a write strategy power level corresponding to a logic level represented in the encoded run-length data, the strategy module further configured to generate a synchronous sampling signal, and a laser power control module configured to sample a feedback signal based on the synchronous sampling signal and configured to update a laser driver power level based on the sampled feedback signal values, in which a sampling point within the synchronous sampling signal is based on a last clock cycle associated with a generated write strategy signal pulse and one or more predetermined delays.

In a second embodiment, a method of performing forward sense calibration of write laser power in an optical disc drive is described that includes, generating encoded run-length data, generating write strategy data based on the run-length data, the write strategy data including a write strategy segment corresponding to a logic level represented in the run-length data, generating a synchronous sampling signal that includes a sampling point based on a last clock cycle associated with the write strategy segment and one or more predetermined delays, sampling a feedback signal based on the synchronous sampling signal to produce sampled signal values, and updating a laser driver power level based on the sampled signal values.

In a third embodiment, a method of generating a synchronous sampling signal is described that includes: determining a last clock cycle associated with a generated write strategy signal segment, and setting a sample point in the sampling signal based on the last clock cycle and a predetermined delay, in which the predetermined delay is selected from a data store of predetermined delays based in part on the generated write strategy signal segment.

BRIEF DESCRIPTION OF THE DRAWINGS

Embodiments of optical disc drives that perform automatic forward sense calibration of write laser power using a sample and hold sampling strategy that is automatically determined based on an automatically selected write strategy will be described with reference to the following drawings, wherein like numerals designate like elements, and wherein.

DETAILED DESCRIPTION OF EMBODIMENTS

Figure 1:
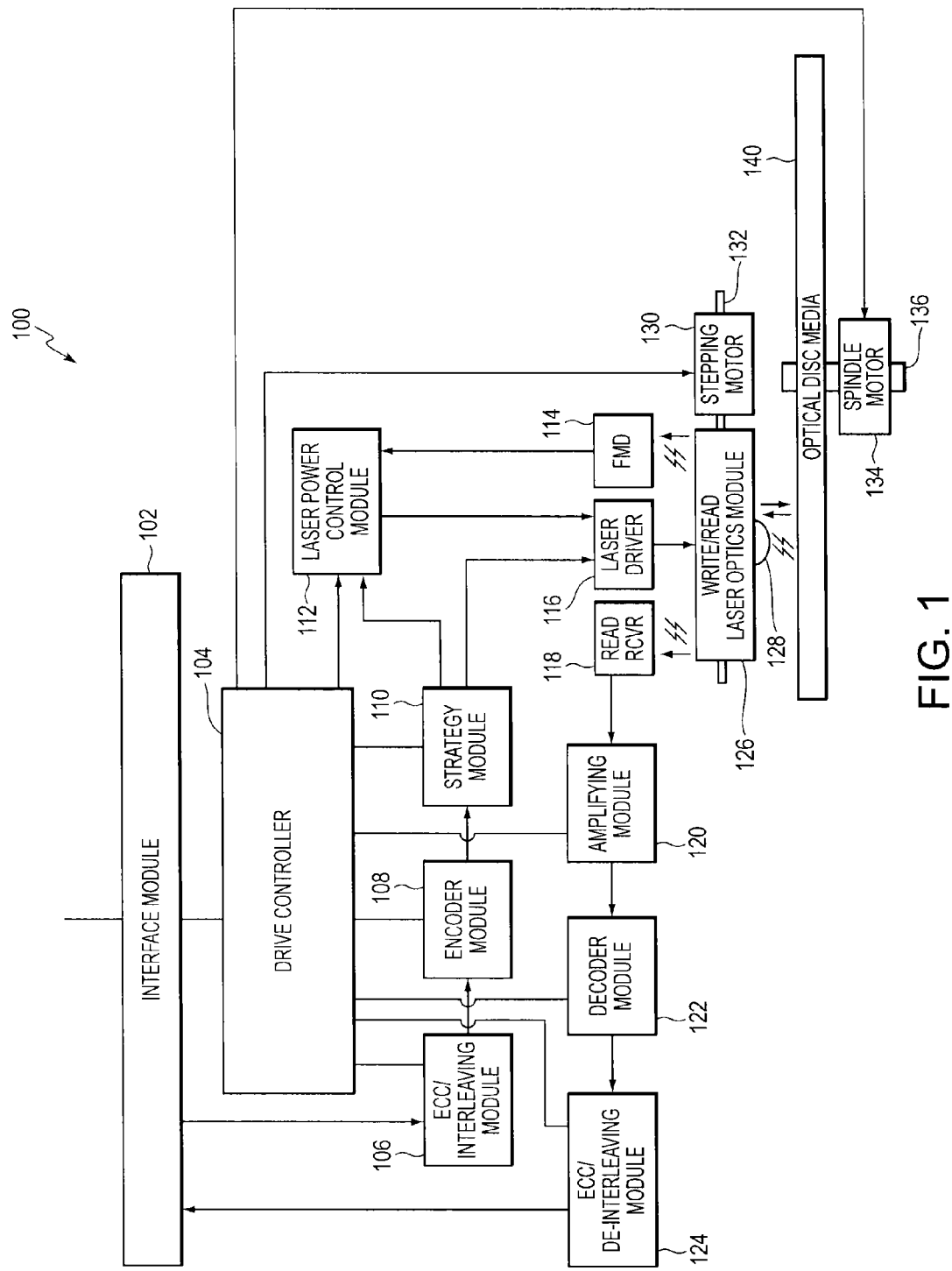
FIG. 1 is a block diagram of an example of an optical disc drive that performs automatic forward sense calibration of write laser power using a sample and hold sampling strategy that is automatically determined based on an automatically selected write strategy.

FIG. 1 is a block diagram of an example of an optical disc drive that performs automatic forward sense calibration of write laser power using a sample and hold sampling strategy that is automatically determined based on an automatically selected write strategy As shown in FIG. 1, optical disc drive 100 may include an interface module 102, a drive controller 104, an error correction code (ECC)/interleaving module 106, an encoder module 108, a strategy module 110, a laser power control module 112, a front monitor diode (FMD) 114, a laser driver 116, a read receiver 118, an amplifying module 120, a decoder module 122, an ECC/de-interleaving module 124, a write/read laser optics module 126, a stepping motor 130, and a spindle motor 134.

As further shown in FIG. 1, drive controller 104 is connected to and communicates with interface module 102, ECC/interleaving module 106, encoder module 108, strategy module 110, laser power control module 112, amplifying module 120, decoder module 122, and ECC/de-interleaving module 124; strategy module 110 further communicates with laser power control module 112 and laser driver 116; laser driver 116 communicates with write/read laser optics module 126; laser power control module 112 further communicates with laser driver 116 and front monitor diode 114; and read receiver 118 communicates with amplifying module 120. In addition, write/read laser optics module 126 is mechanically driven by stepping motor 130 via stepping motor drive shaft 132, and an optical disc media 140 is mechanically driven by spindle motor 134 via spindle motor drive shaft 136.

In operation, drive controller 104 communicates via interface module 102 with a remote processing device, or data source, not shown, such as, for example, a personal computer, workstation or other device configured to support the writing of data to an optical disc media via optical disc drive 100. In one embodiment, drive controller 104 receives via interface module 102 from the remote processing device during an installation process, configuration and control parameters that drive controller 104 may store in a local data store, e.g., read once memory (ROM), random access memory (RAM) memory or static RAM, for later use in controlling optical disc drive 100. In another embodiment, drive controller 104 is pre-configured with configuration and control parameters stored in a local data store, e.g., ROM memory, for use in controlling optical disc drive 100. In one embodiment, the configuration and control parameters stored by drive controller 104 are dynamically loaded from local memory, as needed, thereby allowing optical disc drive 100 to be used to support read/write operations for a wide range of optical disc media, write modes and write strategies, as described in greater detail below.

In response to the receipt of a write request, via interface module 102, from a data source, drive controller 104 initializes ECC/interleaving module 106, encoder module 108, strategy module 110, and laser power control module 112 to support a write operation. Subsequently received write buffers received via interface module 102 in association with the write request may bypass drive controller 104 and may be received directly by ECC/interleaving module 106. ECC/ interleaving module 106 may store the write buffers, apply one or more error correction codes and data interleaving, and may pass the ECC/interleaving formatted buffer to encoder module 108. Encoder module 108 encodes the received ECC/ interleave formatted buffer to produced an encoded buffer, and passes the encoded buffer to strategy module 110. Strategy module 110 applies a write strategy to convert the received encoded data, which may also be referred to as binary non-return-to-zero (NRZ) data, to a signal with higher time resolution and multiple power levels, and passes the write strategy signal to laser driver 116. Laser driver 116 uses the write strategy signal to drive a write laser in write/read laser optics module 126, the light from which is focused by one or more lenses 128 onto optical disc media 140, thereby allowing the data represented by the write strategy signal to be recorded on to the optical disc media. During the laser write process, optical disc media is rotated about a central axis by spindle motor 136, and write/read laser optics module 126 is controllably stepped in a radial direction across the optical disc media, thereby allowing the write strategy signal to be recorded as data marks, or data pits, i.e., burned areas on the optical disc media, and spaces, i.e., non-burned areas on the optical disc media, arranged in a contiguous circular spiral pattern on optical disc media 140.

As shown in FIG. 1, the power used by laser driver 116 to drive the generation of write laser pulses produced by write/ read laser optics module 126 in response to a write strategy signal received from strategy module 110, is controlled by laser power control module 112. Further, laser power control module 112 receives a feedback signal from front monitoring diode 114 that corresponds to an actual intensity of the laser write signal emitted from write/read laser optics module 126 in response to one or more power levels. Laser power control module 112 uses this feedback to dynamically adjust the power control signal supplied to laser driver 116 for the respective write strategy power levels, as described in greater detail below with respect to FIG. 9.

Note that different embodiments of optical disc drive 100 may be statically configured, and/or dynamically configured to support writing to, and reading from, one or more types of optical disc media e.g., compact disc recordable (CD-R), compact disc read-only memory (CD-ROM), compact discrewritable (CD-RW), compact disc write-once (CD-WO), compact disc recordable and erasable (CD-RE), digital versatile disc (DVD), high-definition digital versatile disc (HD DVD), blu-ray disc (BD), using or more write modes (1×, 6×, 32×, etc.) that use one or more write strategies. Based on the type of data to be stored and the type of optical disc media being written to, or read from, different write strategies for different optical disc types in different write modes may require use of different control parameters which may include, but are not limited to, different encoding techniques, different write strategies, different laser power strengths, different spindle motor speeds, different stepping motor speeds and/or step increments, different decoding techniques, and/or different ECC techniques. Therefore, embodiments of optical disc drive 100 may allow drive controller 104 to dynamically reconfigure the components of optical disc drive 100 based on stored control parameters to support one or more different operating characteristics.

Further, note that different embodiments of optical disc drive 100 may be statically configured, and/or dynamically configured to perform automatic forward sense calibration of write laser power using a sample and hold sampling strategy that is automatically determined based on an automatically selected write strategy. Based on, for example, the optical disc type, and the write mode (e.g., 1×, 6×, 32×), etc., different sample and hold delay information may be used by strategy module 110 and laser power control module 112 to monitor and control the irradiation power of the laser beam emitted from the optical disc drive write/read laser optics module during the write process. In one embodiment, strategy module 110 and laser power control module 112 receive sample and hold delay data during an installation process in which configuration and control parameters are stored in a local data store, e.g., read once memory (ROM), random access memory (RAM) memory or static RAM, for later use in controlling the sample and hold sampling strategy based on the selected write configuration. In another embodiment, strategy module 110 and laser power control module 112 receive sample and hold delay data, e.g., from drive controller 104, as part of a dynamic configuration process in which configuration and control parameters stored by drive controller 104 are dynamically loaded to strategy module 110 and laser power control module 112 as needed to support a currently selected optical disc media type, write mode and/or write strategy. An process which can be used to generate and store sample and hold delay data for a set of selected optical disc media types, write modes and/or write strategies, is described below with respect to FIG. 6 and FIG. 7. A process that can be used by, for example, strategy module 110 to generate a synchronous sampling signal based on the received sample and hold delay data for a currently selected optical disc media type, write mode and/or write strategy that is used to control when laser power control module 112 samples an incoming analog forward sense feedback signal is described below with respect to FIG. 8.

For example, based on the optical disc media and/or write format requested by a write source via interface 102, drive controller 104 may configure laser power control module 112 and strategy module 110 to control laser driver 116 to support several different levels of laser power. Laser power control module assures that the desired levels of laser output are achieved and maintained throughout the write process based on feedback provided by front monitoring diode 114 with respect to the actual power of light emitted from write/read laser optics module 126 with respect to each specific write strategy power level, as described in greater detail below with respect to FIG. 9.

Figure 2:
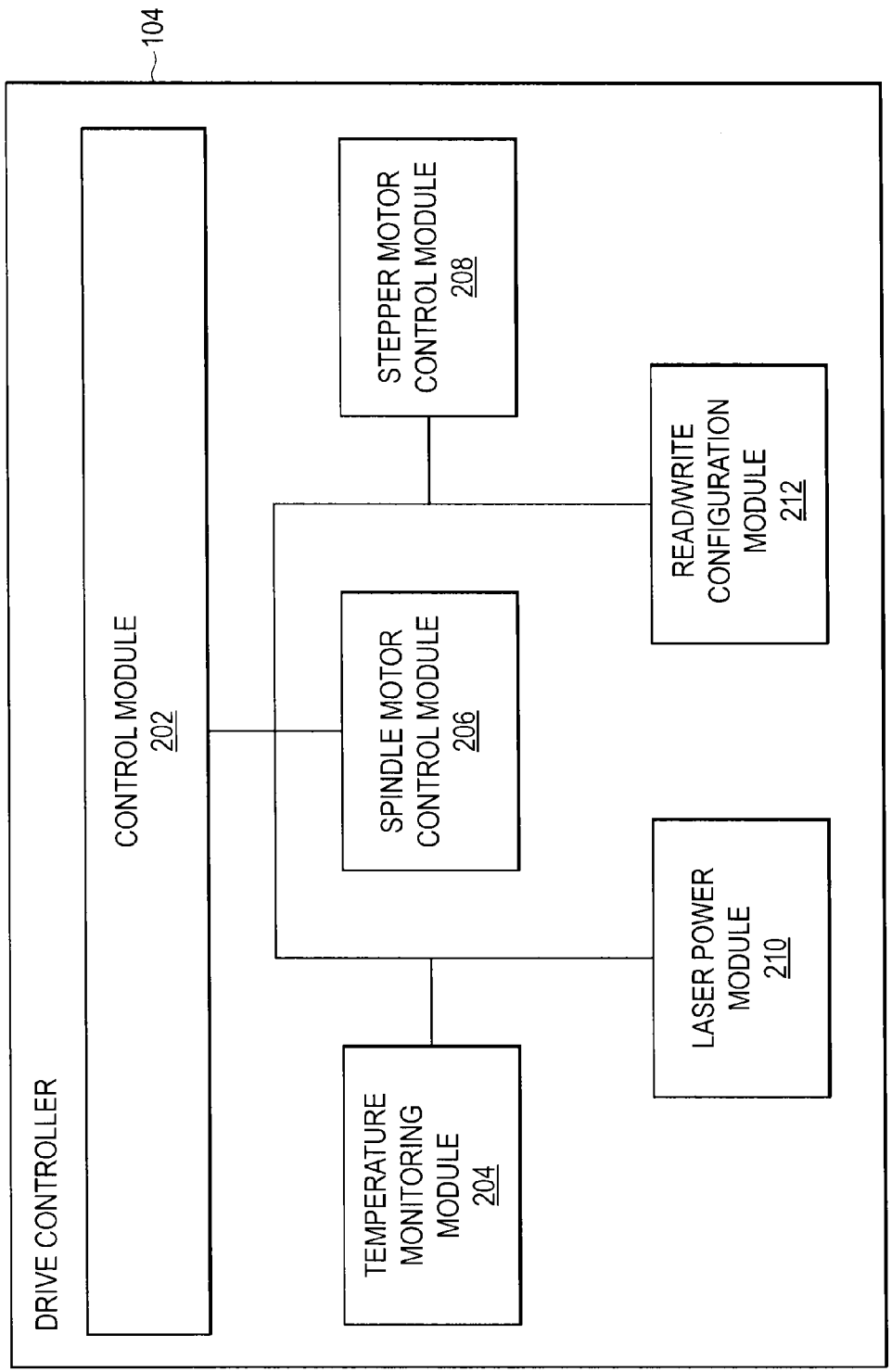
FIG. 2 is a detail block diagram of the drive controller of FIG. 1.

FIG. 2 is a block diagram of an embodiment of drive controller 104 described above with respect to FIG. 1. As shown in FIG. 2, drive controller 104 includes a control module 202 in communication with a temperature monitoring module 204, a spindle motor control module 206, a stepper motor control module 208, a laser power module 210 and a read/write configuration module 212. Control module 202 controls all operations performed by drive controller 104. In addition to communicating with the modules shown in FIG. 2, control module 202 controls either directly or indirectly all the modules described above with respect to FIG. 1 as communicating with drive controller 104, e.g., based on control signals sent to the respective modules on a real-time basis, or based on static and/or dynamically updated control parameters transmitted to the respective modules. For example, control module 202 controls operation of stepper motor 130 via stepper motor control module 208; control module 202 controls operation of spindle motor 134 via spindle motor control module 206; control module 202 controls operation of strategy module 110 via read/write configuration module 212; and control module 202 controls operation of laser power control module 112 via laser power module 210 and/or via read/write configuration module 212, as described in greater detail below.

Note that the modules described above with respect to FIG. 2, and the function each performs, may be integrated and/or distributed in any manner across any number of modules which may be implemented within an example embodiment of optical disc drive 100 using in any combination of hardware, software and/or firmware.

Figure 3:
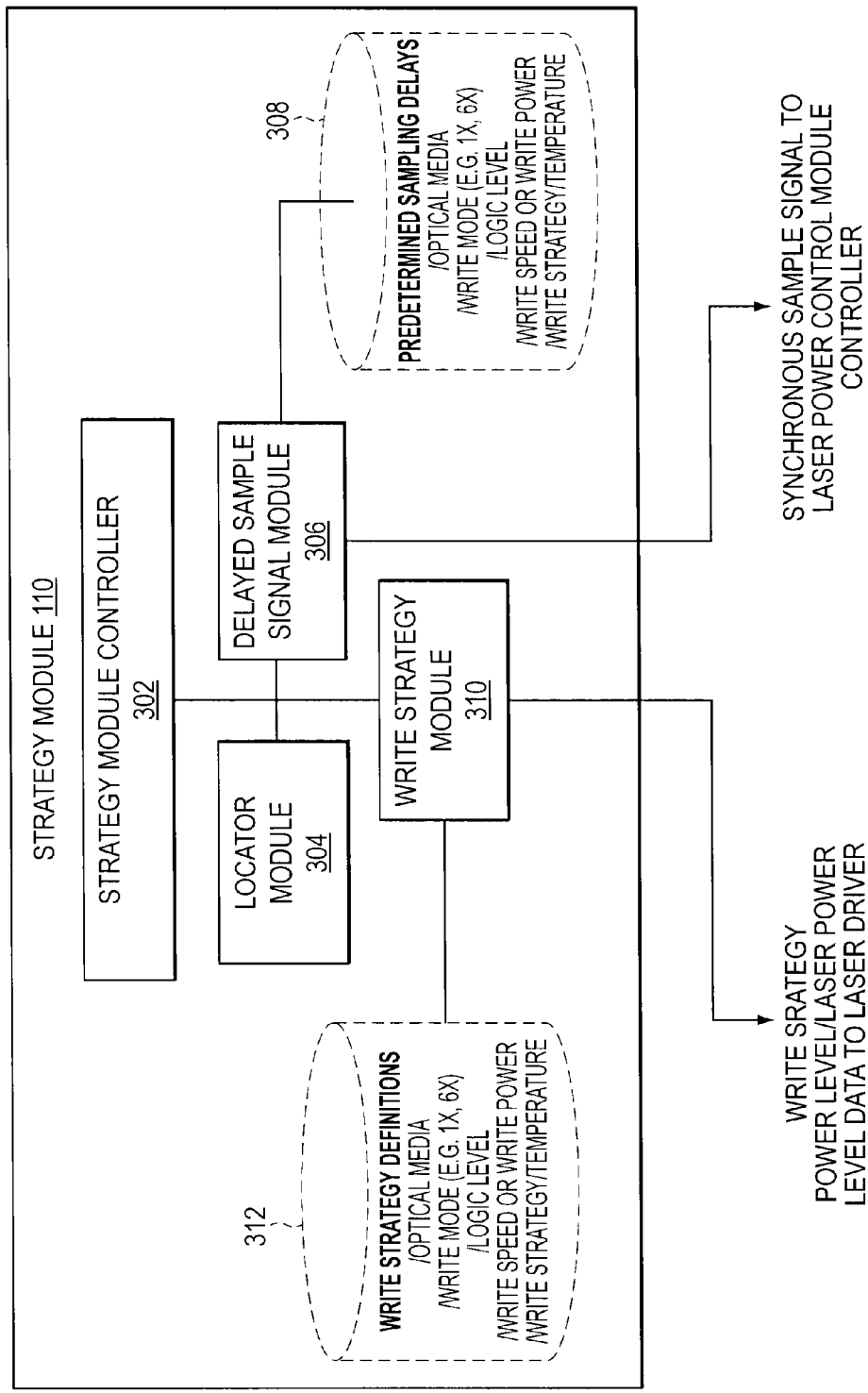
FIG. 3 is a detail block diagram of the strategy module of FIG. 1.

FIG. 3 is a block diagram of an embodiment of strategy module 110 described above with respect to FIG. 1. As shown in FIG. 3, strategy module 110 includes a strategy module controller 302, a locator module 304, a delayed sample signal module 306 with a predetermined sampling delay data store 308, and a write strategy module 310 with a predetermined write strategy definitions data store 312. Strategy module controller 302 communicates with control module 202 and read/write configuration module 212 to receive control parameters, e.g., write strategy definitions that are stored in predetermined write strategy definitions data store 312 and feedback signal sampling delays stored in predetermined sampling delay data store 308. Write strategy module 310 uses write strategy definitions stored in predetermined write strategy definitions data store 312 to control the generation of write strategy code segments based on incoming run-length code segments received from encoder module 108. The generated write strategy code segments are transmitted to laser driver 116 to drive the write laser in write/read laser optics module 126.

Delayed sample signal module 306 uses the predetermined sampling delays stored in predetermined sampling delay data store 308 to generate a synchronous sampling signal based on the generated write strategy code segments, as described in greater detail below. The generated synchronous sampling signal is transmitted to laser power control module 112 to control the sampling of a feedback signal generated by a forward monitoring diode 114 monitoring the output of the laser diode produced as a result of the generated write strategy code segments sent to laser driver 116 by write strategy module 310.

Locator module 304 monitors the write strategy code segments output from write strategy module 310 and determines whether a duration of a write strategy logic level output in a respective write strategy code segment is sufficiently long to provide a stable area to perform a sample and hold operation. If locator module 304 determines that the duration of a write strategy logic level, as output in the respective write strategy code segments, is sufficiently long to support collection of a reliable sample for use in performing forward sense calibration of write laser power, locator module 304 does not affect the content of the synchronous sampling signal produced by delayed sample signal module 306. However, if locator module 304 determines that the duration of a write strategy logic level in a write strategy code segment is not sufficiently long to obtain a reliable feedback sample for use in performing forward sense calibration of write laser power, locator module 304 instructs delayed sample signal module 306 to not include a sampling point in the synchronous sampling signal for the corresponding write strategy logic level.

Figure 4:
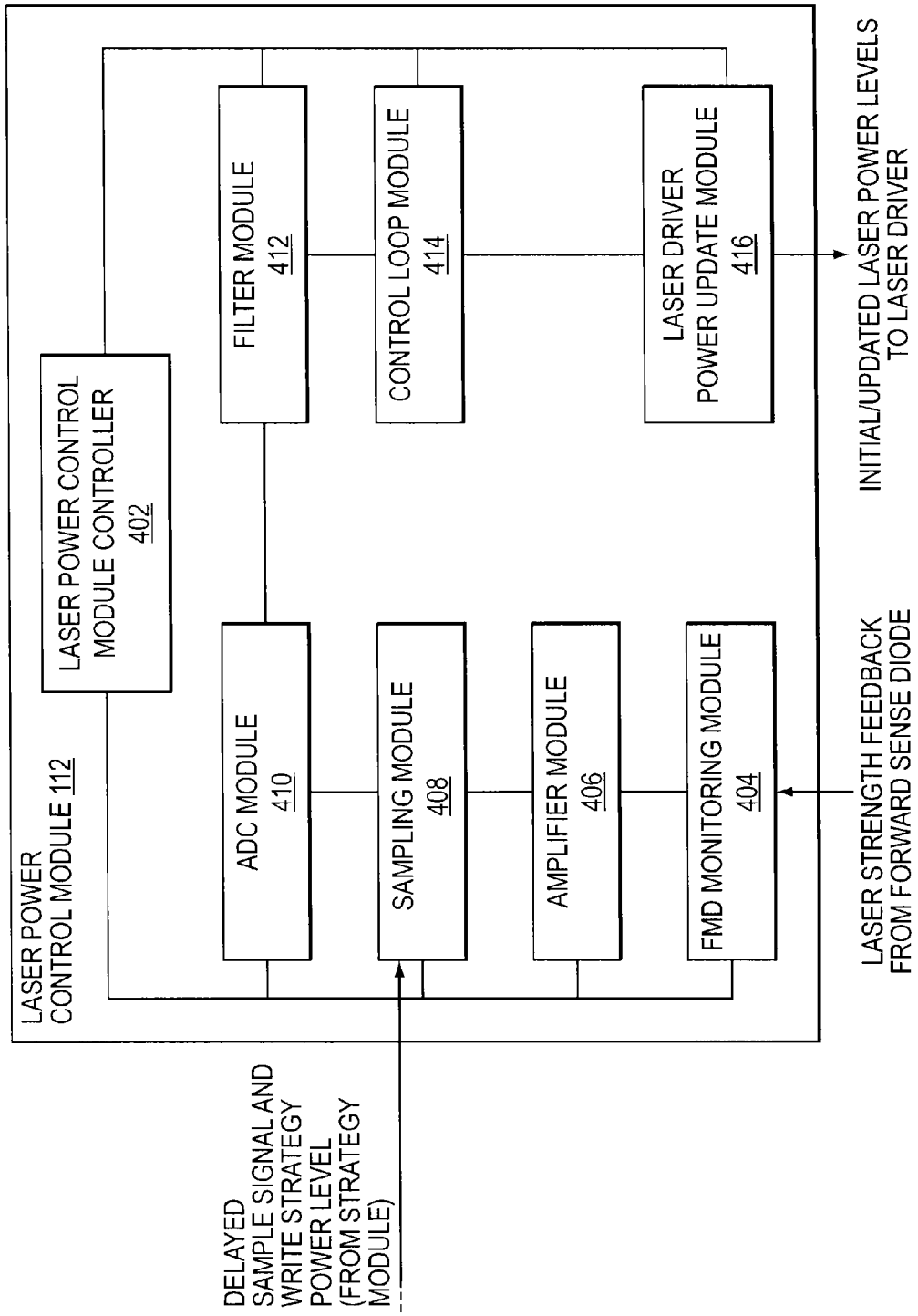
FIG. 4 is a detail block diagram of the laser power control module of FIG. 1.

FIG. 4 is a block diagram of an embodiment of laser power control module 112 described above with respect to FIG. 1. As shown in FIG. 4, laser power control module 112 may include a laser power control module controller 402, an FMD monitoring module 404, an amplifier module 406, a sampling module 408, and analog-to-digital conversion (ADC) module, a filter module 412, a control loop module 414 and a laser driver power update module 416.

Laser power control module controller 402 communicates with control module 202 of drive controller 104 to receive control parameters that are used for controlling laser power validation and correction operations using the forward sense sampling of laser power techniques described below. FMD monitoring module 404 receives an analog laser strength feedback signal from a light sensitive monitoring diode, e.g., a front monitor diode (FMD), positioned to monitor the irradiation power of the write laser included in write/read laser optics module 126 and passes the signal to amplifier module 406. Amplifier module 406 amplifies the analog laser strength feedback signal and passes the signal to sampling module 408.

Sampling module 408 receives the analog laser strength feedback signal from amplifier module 406 and a synchronous sampling signal from the delayed sample signal module 306 of strategy module 110, and samples the analog laser strength feedback signal based on the binary content of the synchronous sampling signal. For example, the synchronous sampling signal may include 1-bit for each system clock in which a HIGH 1-bit value instructs sampling module 408 to sample the analog laser strength feedback signal, and a LOW 1-bit value instructs sampling module 408 not to sample the analog laser strength feedback signal. In such an embodiment, sampling module 408 samples the incoming analog laser strength feedback signal whenever the corresponding synchronous sampling signal is HIGH, and sampling module 408 forwards the analog sample magnitude to ADC module 410. ADC module 410 converts the received analog sample magnitude to a digital value and stores the values for use by filter module 412.

Filter module 412 receives a plurality of digital sample values corresponding to a write strategy power level and processes the respective values to remove outlying values and/or to generate statistically relevant values such a meanvalue, an average value, and a standard deviation for digital values corresponding to a common write strategy power level during a predetermined time period. The filtered data and/or related statistics are passed to control loop module 414. Control loop 414 determines a difference between the measured laser power and the expected laser power and if the difference exceeds an allowed threshold value, control loop 414 instructs laser driver power update module 416 to generate a new laser power level control parameter for the write strategy power level. In response, laser driver power update module 416 generates and provides the new laser power level control parameter to laser driver 116 to control the magnitude of subsequent laser emissions for the corresponding write strategy power level.

Figure 5:
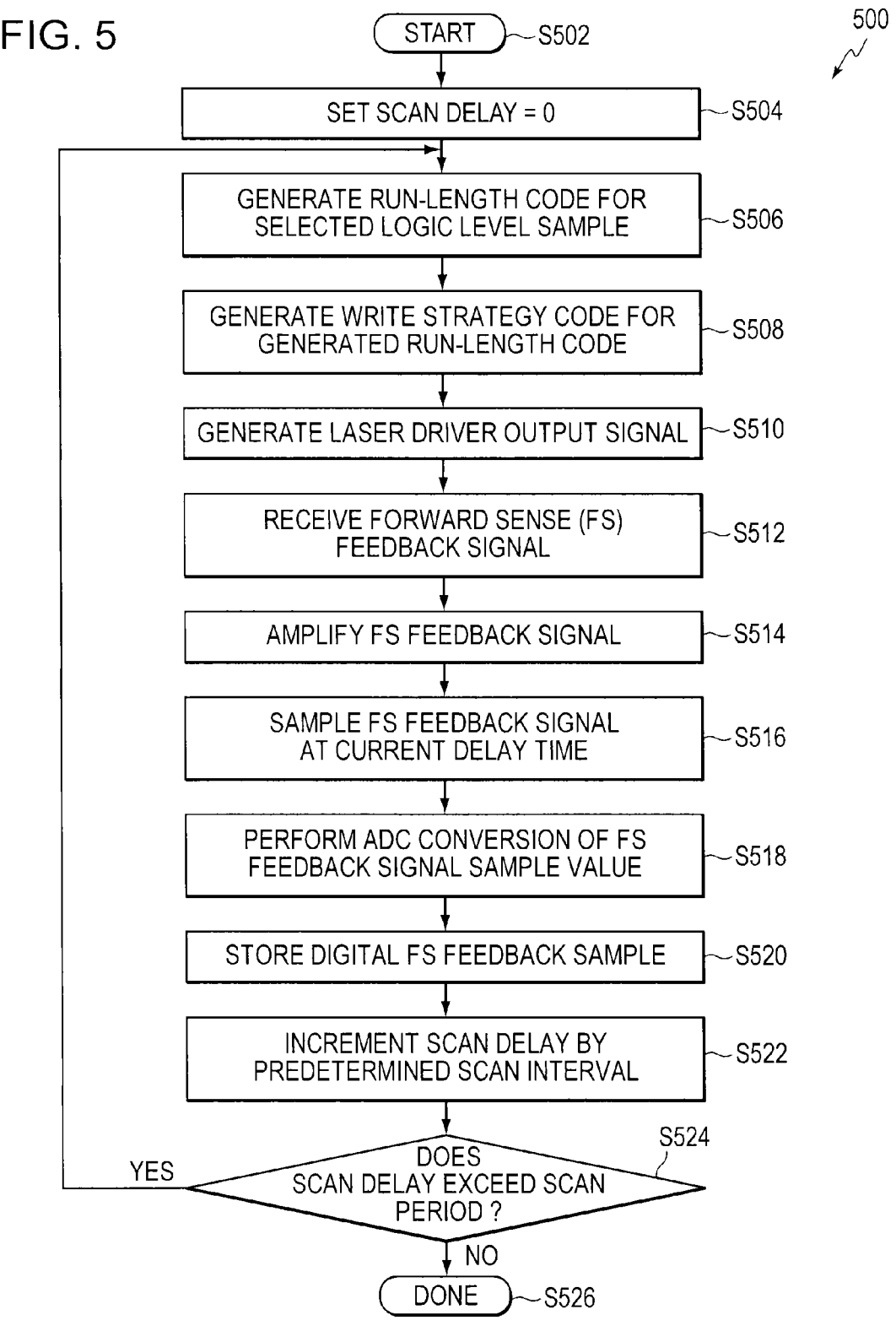
FIG. 5 shows a flow-chart of a process for sampling a forward sense feedback signal at stepped delay periods to obtain a measure of the shape of the forward sense feedback signal relative to time.

FIG. 5 shows a flow-chart of a process for sampling a laser strength feedback signal at stepped delay periods to obtain a measure of the shape of, e.g., generate convolution based scan data for, the laser strength feedback signal relative to time. In one embodiment, the approach described below with respect to FIG. 5 may be performed as part of a calibration routine supported by drive controller 104, encoder module 108, strategy module 110, laser power control module 112. The technique described with respect to FIG. 5 is used in the process for determining sample and hold sampling delay parameters across a wide range of optical media and write strategies supported by an optical disc drive, as described with respect to FIG. 6 and FIG. 7. As shown in FIG. 5, operation of process 500 begins at S502 and proceeds to S504.

At S504, drive controller 104 initializes a scan delay to zero, so that no scan delay is initially applied, and operation of the process continues at S506.

At S506, encoder module 108 is instructed by drive controller 104 to generate a run-length code segment based on a sample logic that maintains a selected constant logic level for a duration that exceeds a predetermined minimum, and operation of the process continues at S508. For example, in an example embodiment in which the process flow described here with respect to FIG. 5 is performed as part of a calibration routine controlled by drive controller 104, drive controller 104 instructs encoder module 108 to initiate a run-length segment that includes a sufficient number of consecutive HIGH logic values or a sufficient number of consecutive LOW logic values such that a resulting stream of write strategy power level values exceeds a predetermine minimum duration and therefore results in the generation of a feedback signal that includes a minimum safe write strategy code width that allows the collection of a valid laser strength feedback signal sample for the HIGH/LOW laser write value being evaluated.

At S508, strategy module 110 is instructed by drive controller 104 to generate a write strategy code segment based on the run-length code segment generated at S506 and to generate a corresponding synchronous sampling signal in which a single HIGH values is included at zero+scan delay clock cycles from the start of the synchronous sampling signal. The write strategy code segment and the synchronous sampling signal are time synchronized, i.e., their respective starting points are aligned with respect to a common time scale, and transmission is initiated to their respective recipients. For example, transmission of the write strategy code segment is initiated to laser driver 116 and transmission of the synchronous sampling signal is transmitted to sampling module 408, and operation of the process continues at S510.

At S510, laser driver 116 generates a laser driver output signal, based on the write strategy code segment generated at S508, that is transmitted to write/read laser optics module 126 to drive the write laser diode contained within, and operation of the process continues at S512.

At S512, a light sensitive monitoring diode, e.g., a front monitor diode (FMD) 114 positioned to monitor the irradiation power of the write laser diode included in write/read laser optics module 126 generates a laser strength feedback signal that is transferred to amplifier module 406 of laser power control module 112 via FMD monitoring module 404, and operation of the process continues at S514.

At S514, amplifier module 406 amplifies the received laser strength feedback signal and passes the amplified laser strength feedback signal to sampling module 408, and operation of the process continues at S516.

At S516, sampling module 408 samples the amplified laser strength feedback signal at a time that corresponds to the receipt of a HIGH value on the synchronous sampling signal received from strategy module 110, as described above at S508, and operation of the process continues at S518. Note that HIGH values on the synchronous sampling signal received from strategy module 110 have been shifted in time to include one or more predetermined delays retrieved from predetermined sampling delay data store 308, as described above with respect delayed sample signal module 306 shown in FIG. 3, and as describe below with respect to FIG. 8 at S824.

At S518, ADC module 410 performs an analog to digital conversion of the sampled magnitude of the amplified laser strength feedback signal, and operation of the process continues at S520.

At S520, ADC module 410 stores the generated digitized amplified laser strength feedback signal magnitude, and operation of the process continues at S522.

At S522, drive controller 104 increments the scan delay by a predetermined period of time, and operation of the process continues at S524.

At S524, if the incremented scan delay exceeds a predetermined scanning period, operation of the process terminates at S528; otherwise, operation of the process continues at S510.

Figure 6:
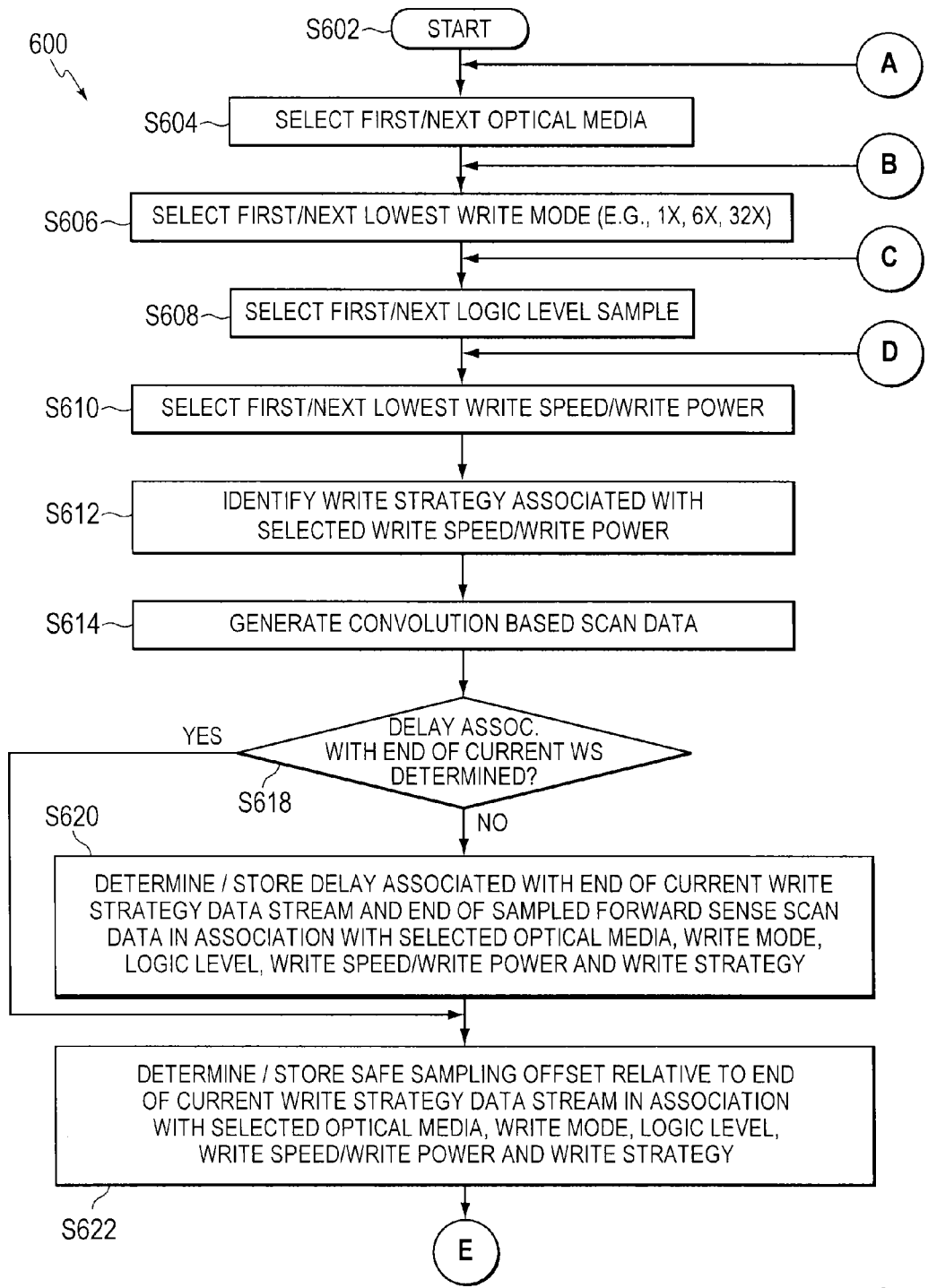
FIG. 6 and FIG. 7 show a flow-chart of a process for determining sample and hold sampling delay parameters across a wide range of optical media and write strategies supported by an optical disc drive.
Figure 7:
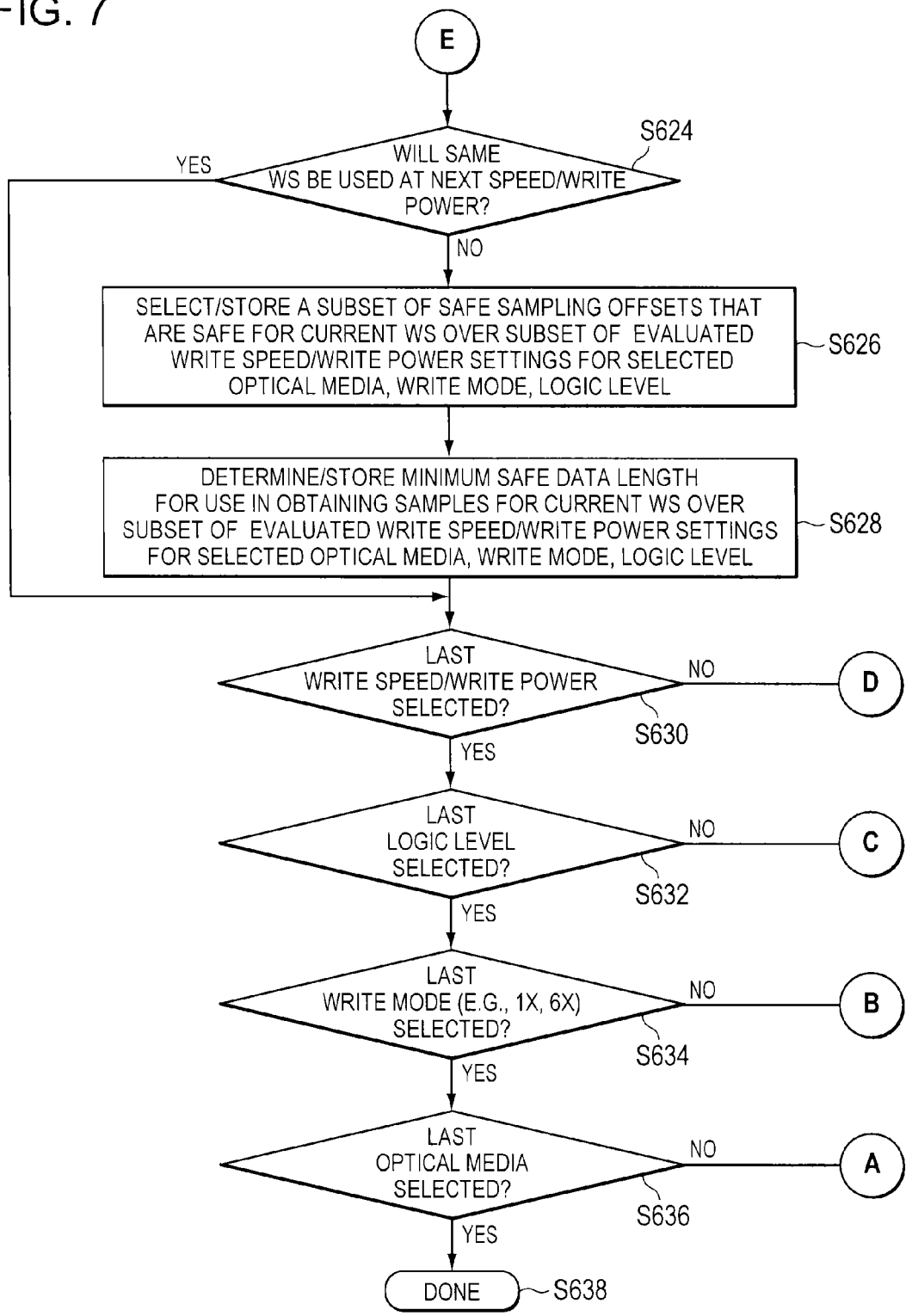

FIG. 6 and FIG. 7 show a flow-chart of process for determining sample and hold sampling delay parameters across a wide range of optical media and write strategies supported by an optical disc drive. In one embodiment, the process described below can be performed without any optical media being inserted into the optical disc drive, thereby allowing the approach described below with respect to FIG. 6 and FIG. 7 to be performed as part of a calibration routine supported by drive controller 104, encoder module 108, strategy module 110, laser power control module 112. It is assumed in the process flow described below with respect to FIG. 6 and FIG. 7 that the optical disc drive is preprogrammed data related to the optical media, write modes, write strategies, and write strategy power levels supported by the optical disc drive. Further it is assumed that drive controller 104 has access to such data and, therefore, is able to assure that sample and hold sampling delay parameters are determined for all valid combinations. References to selecting the first/next of an item in the process flow described below with respect to FIG. 6 and FIG. 7, are indicating that the next valid combination option is selected for analysis. As shown in FIG. 6, operation of process 600 begins at S602 and proceeds to S604.

At S604, drive controller 104 selects a first/next optical media supported by the disc drive, and operation of the process continues at S606.

At S606, drive controller 104 selects a first/next lowest write mode (e.g., 1×, 6×, 32×, etc.) supported by the disc drive for the currently selected optical media/write mode combination, and operation of the process continues at S608.

At S608, drive controller 104 selects the first/next logic level sample, e.g., a HIGH logic value or a LOW logic level, and operation of the process continues at S610.

At S610, drive controller 104 selects the first/next lowest write speed/write power, typically associated with the innermost optical media track, and operation of the process continues at S612.

At S612, read/write configuration module 212 of drive controller 104 selects a write strategy based on the currently selected optical media/write mode/logic level/write speed or write power combination, and operation of the process continues at S614.

At S614, drive controller 104 generates convolution based scan data of a laser strength feedback signal generated based on the currently selected media/write mode/logic level/write speed or write power combination, e.g., using the process described above with respect to FIG. 5, and operation of the process continues at S618. For example, a graphical representation of such convolution based scan data is described below with respect to FIG. 13 at 1314.

At S618, if a delay associated with the currently selected optical media/write mode/logic level/write speed or write power combination was previously determined, operation of the process terminates at S622; otherwise, operation of the process continues at S620.

At S620, drive controller 104, aligns features of the write strategy code segment with features of the convolution based scan data generated at S614 along a common time axis. Based on this alignment, drive controller 104, determines and stores a delay, which may be referred to as a block delay, between the transmission of features of the write strategy code segment from strategy module 110 and receipt of the corresponding feature in the laser strength feedback signal received at sampling module 408 of laser power control module 112, and operation of the process continues at S622.

At S622, drive controller 104, aligns the write strategy code segment and the convolution based scan data based on the block delay previously determined at S620 for the currently selected optical media/write mode/logic level/write speed or write power combination and determines and stores one or more sampling delays that would result in valid laser strength feedback signal samples for use in forward sense calibration of write laser power for the currently selected optical media/write mode/logic level/write speed or write power combination, and operation of the process continues at S624.

At S624, if drive controller 104, determines that the same write strategy will not be used at the next write speed/write power to be evaluated, operation of the process proceeds to S626; otherwise, operation of the process continues at S626.

At S626, drive controller 104 selects a subset of the sampling delays determined at S622 for each combination in the set of optical media/write mode/logic level/write speed/write power combinations evaluated, that result in valid laser strength feedback signal samples all the evaluated combinations, and operation of the process continues at S628.

At S628, drive controller 104 determines and stores, based on the sampling delays selected at S626, a minimum safe write strategy code width that that would allow the collection of valid laser strength feedback signal samples for each combination in the set of optical media/write mode/logic level/write speed/write power combinations evaluated, and operation of the process continues at S630.

At S630, if drive controller 104 determines that a last write speed/write power to be evaluated has been selected, operation of the process proceeds to S632; otherwise, operation of the process continues at S610.

At S632, if drive controller 104 determines that a last logic level to be evaluated has been selected, operation of the process proceeds to S634; otherwise, operation of the process continues at S608.

At S634, if drive controller 104 determines that a last write mode to be evaluated has been selected, operation of the process proceeds to S636; otherwise, operation of the process continues at S606.

At S636, if drive controller 104 determines that a last optical media to be evaluated has been selected, operation of the process terminates at S638; otherwise, operation of the process continues at S604.

Figure 8:
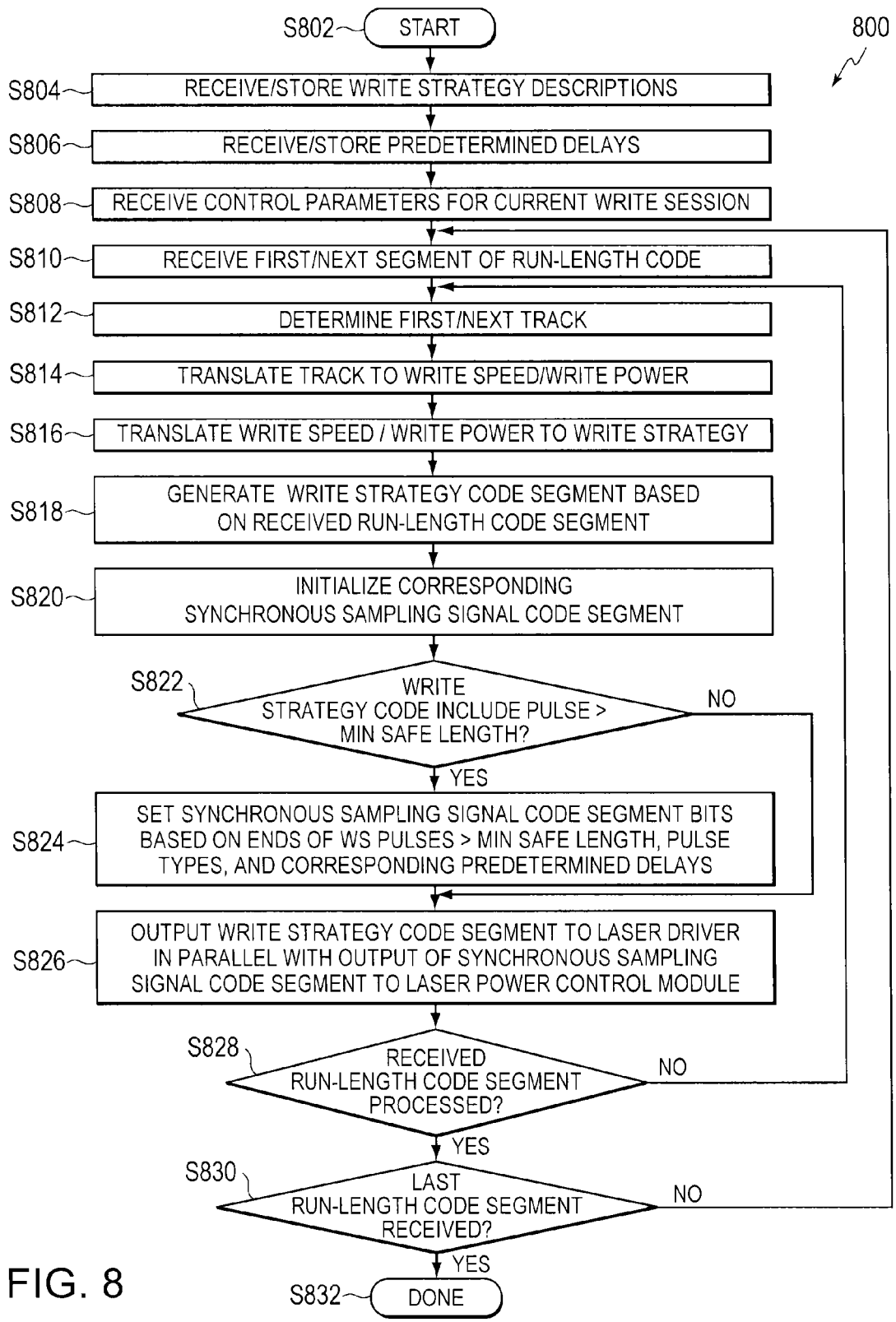
FIG. 8 shows a flow-chart of a process for controlling the example strategy module of FIG. 3 to generate a write strategy code segment and a corresponding synchronous sample and hold signal that incorporates a sample and hold delay that is automatically determined based on a currently selected write configuration.

FIG. 8 shows a flow-chart of a process for controlling the strategy module 110 of FIG. 3 to generate a write strategy code segment and a corresponding synchronous sampling signal that incorporates a sampling delay that is automatically determined based on a currently selected write configuration. For example, sampling delays associated with a write strategy segment for each optical media/write mode/logic level/write speed/write power combination supported by the optical disc drive may be predetermined using a calibration process such as that described above with respect to FIG. 5, FIG. 6 and FIG. 7, and may be loaded by drive controller 104 to strategy module 110, as needed. As shown in FIG. 8, operation of process 800 begins at S802 and proceeds to S804.

At S804, strategy module controller 302 receive, and store in predetermined write strategy definitions data store 312, write strategy definitions that include, for example, predetermined write strategy power level pulse patterns, or write strategy segment, for each optical media/write mode/logic level/write speed/write power combination supported by the optical disc drive, and operation of the process continues at S806.

At S806, strategy module controller 302 receive, and store in predetermined sampling delay data store 308, synchronous sampling signal delays that include, for example, a predetermined block delay, a minimum write strategy safe pulse width, and a set of safe sampling offset delays for each safe sampling point determined for each write strategy optical media/write mode/logic level combination, predetermined as described above with respect to FIG. 5. FIG. 6, and FIG. 7, and operation of the process proceeds to S808.

At S808, strategy module controller 302 receives from strategy module controller 302 a set of control parameters, e.g., a optical media/write mode, for a requested write session, and the process continues at S810.

At S810, strategy module controller 302 receives from encoder module 108 a first/next segment of run-length code, and the process continues at S812.

At S812, strategy module controller 302 communicates with stepper motor control module 208 to determine a next track to be written, and the process continues at S814.

At S814, strategy module controller 302 translates the next track information received at S812 to a write speed and write power, and the process continues at S816.

At S816, strategy module controller 302 translates the determined write speed and write power and current optical media/write mode/logic level combination to a selected write strategy for the received run-length code segment, and the process continues at S818.

At S818, write strategy module 310 generates a write code segment that corresponds to the received run-length code segment based on the selected write strategy, and the process continues at S820.

At S820, write strategy module 310 initializes, e.g., sets all bits to zero, a corresponding synchronous sampling signal code segment that corresponds to the generated write strategy code segment, and the process continues at S822.

At S822, if locator module 304 determines that the generated write strategy code segment has a pulse duration that is greater than or equal to a predetermined minimum safe sampling length, stored in predetermined sampling delay data store 308 in association with the currently selected optical media/write mode/logic level combination, operation of the process moves to S824; otherwise, operation of the process continues at S826.

At S824, write strategy module 310 sets selected bits in the generated sampling signal code segment bits to HIGH, based on the determined ends of write segment pulse with a width greater than the predetermined minimum safe sampling length, the pulse logic level, and an offset delay selected from a set of safe sampling points for the optical media/write mode/logic level combination stored in predetermined sampling delay data store 308, and operation of the process continues at S826.

At S826, write strategy module 310 time synchronizes and transmits in parallel, the generated write strategy code segment to laser driver 116, and the generated sampling signal code segment to laser power control module 112, and operation of the process continues at S828.

At S828, if strategy module controller 302 determines that the received run-length code segment has been fully processed and written to the optical drive media, operation of the process terminates at S830; otherwise, operation of the process continues at S812.

At S830, if strategy module controller 302 determines that a last run-length code segment has been received, operation of the process terminates at S832; otherwise, operation of the process continues at S810.

Figure 9:
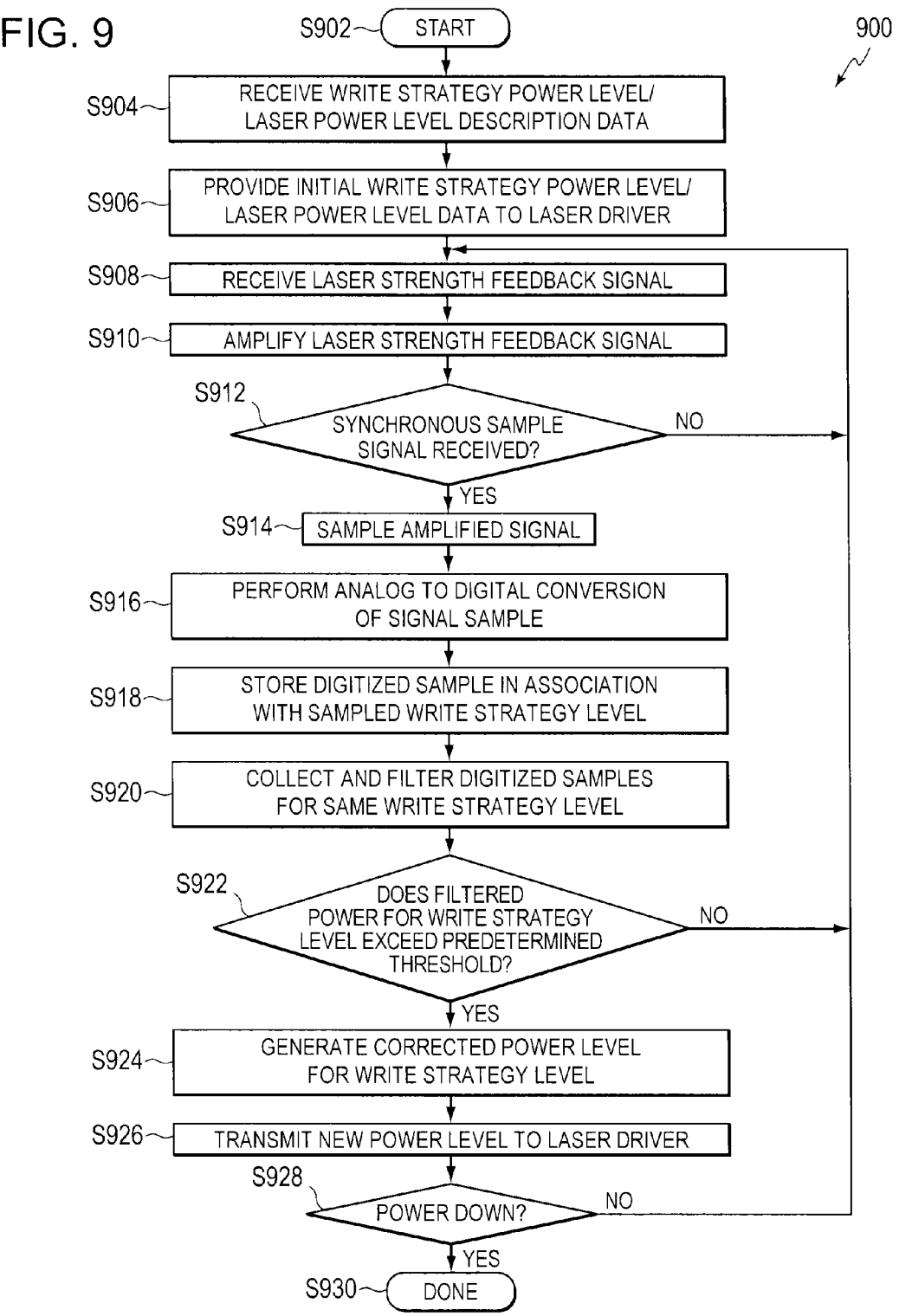
FIG. 9 shows a flow-chart of a process for controlling the example laser power control module of FIG. 4 to generate updated laser power levels based on a received forward sense diode feedback signal.

FIG. 9 shows a flow-chart of a process for controlling the example laser power control module of FIG. 4 to generate updated laser power levels based on a received forward sense diode feedback signal. As shown in FIG. 9, operation of process 900 begins at S902 and proceeds to S904.

At S904, laser power control module controller 402 receives write strategy description data that associates each write strategy power level associated with a currently selected write strategy to a corresponding laser power level, and operation of the process continues at S906.

At S906, laser power control module controller 402 instructs laser driver power update module 416 to send an initial set of control data based on the received write strategy description data to laser driver 116, and operation of the process proceeds to S908.

At S908, forward monitoring module 404 receives an analog laser strength feedback signal from the laser irradiation power monitoring diode, e.g., forward monitoring diode 114 and passes the analog signal to amplifier module 406, and the process continues at S910.

At S910, amplifier module 406 amplifies the analog laser strength feedback signal to produce an amplified analog laser strength feedback signal that is passed to sampling module 406, and operation of the process continues at S912.

At S912, if sampling module 406 determines that a HIGH value has been received via the synchronous sampling signal received from strategy module 110, operation of the process continues at S914; otherwise, operation of the process continues at S908.

At S914, sampling module 406 samples and stores the magnitude of the received amplified analog laser strength feedback signal, and operation of the process continues at S916.

At S916, ADC module 410 performs an analog-to-digital conversion of the sampled magnitude of the amplified analog laser strength feedback signal, and operation of the process continues at S918.

At S918, ADC module 410 stores the digitized sample value in association with the write strategy power level the sample is associated with, and operation of the process continues at S920.

At S920, filter module 412 collects a plurality of digital sample values corresponding to a write strategy power level and filters the respective values to remove outlying values and/or to generate statistically relevant values such a mean-value, an average value, and a standard deviation for digital values corresponding to a common write strategy power level during a predetermined time period, and operation of the process continues at S922.

At S922, if control loop module 414 determines that the filtered digital sample values corresponding to a write strategy power level exceed a predetermined threshold, operation of the process continues at S924; otherwise, operation of the process continues at S908.

At S924, laser driver power update module 416 generates a corrected power level for the write strategy power level, and operation of the process continues at S926.

At S926, laser driver power update module 416 transmits corrected power level data to laser driver 116, and operation of the process continues at S928.

At S928, if laser power control module controller 406 determines that a power down signal has been received, operation of the process terminates at S930; otherwise, operation of the process continues at S908.

Figure 10:
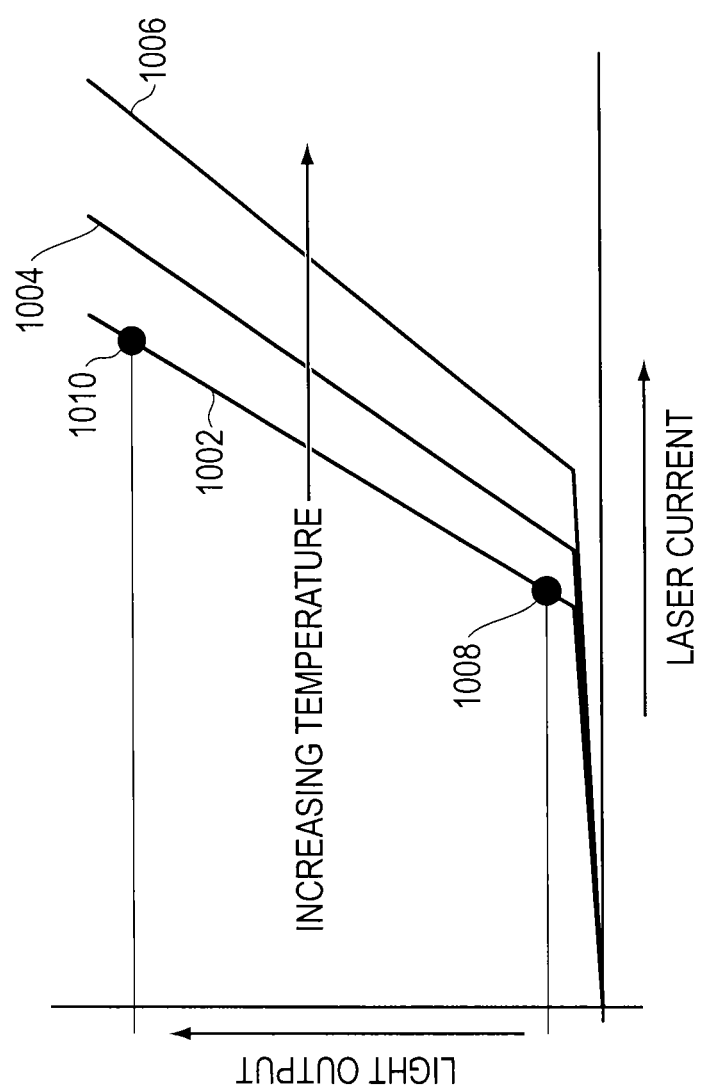
FIG. 10 shows plots of light output from a laser diode across a range of electrical current input levels for a laser diode operating at different temperatures.

FIG. 10 shows plots of laser diode light output, or irradiation power, across a range of electrical current input levels for a laser diode operating at different temperatures. Plot 1002 shows the light output of a laser diode operating at a first temperature and includes an example irradiation output level associated with a LOW write strategy logic level at 1008, and an example irradiation output level associated with a HIGH write strategy logic level at 1010. Plot 1004 shows the light output of the same laser diode operating at a second temperature that is greater than the first temperature; and plot 1006 shows the light output of the same laser diode operating at a third temperature that is greater than the second temperature. The temperature of a diode laser increases with use due to heat build-up in the laser material. Further, the temperature of a diode laser that has been in use will decreases during a period of inactivity following a period of activity. Therefore, the operating temperature, and hence the irradiation output of the write laser of an optical disc drive is constantly changing. For this reason, control loop module 414 and laser driver power update module 416 may receive temperature data from temperature monitoring module 204 to take into account the temperature of the laser diode in making adjustments to write strategy power levels. For example, an adjustment to correct for a low laser irradiation level in a laser diode operating at a higher operating temperature will require a greater increase in current through the laser diode than a similar adjustment on the same laser diode operating at a lower operating temperature.

Figure 11B:
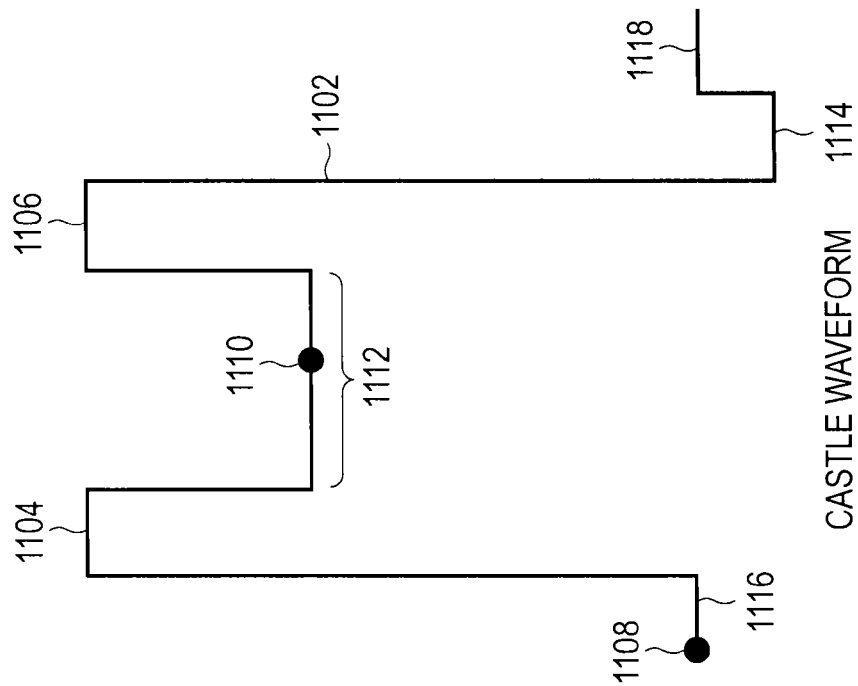
FIG. 11B shows a plot of an idealized laser write strategy castle waveform that includes a sample laser LOW write level and a sample laser HIGH write level that correspond to the sample laser LOW write level and the sample laser HIGH write level shown in FIG. 11A.
Figure 11A:
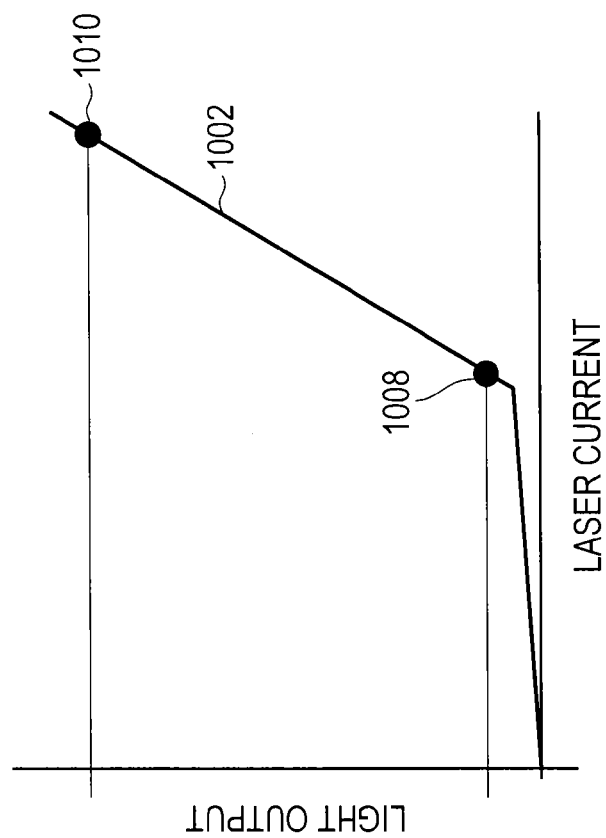
FIG. 11A shows a plot of light output from a laser diode across a range of electrical current input levels at a single laser diode operating temperature, the plot indicating a sample laser LOW write level and a sample laser HIGH write level.

FIG. 11A shows an example plot of light output from a laser diode across a range of electrical current input levels at a single laser diode operating temperature, as described above with respect to FIG. 10, the plot indicating an example irradiation output level associated with a LOW write strategy logic level at 1008, and an example irradiation output level associated with a HIGH write strategy logic level at 1010.

FIG. 11B shows an example plot of an idealized laser write strategy castle waveform 1102, i.e., light output over time. The idealized laser write strategy castle waveform includes a sample LOW write strategy logic level 1108 and sample HIGH write strategy logic level 1110 that correspond to the sample LOW write strategy logic level 1008 and sample HIGH write strategy logic level 1010, respectively, shown in FIG. 11A. In addition, idealized laser write strategy castle waveform includes a sample first castle turret 1104, second castle turret 1106, LOW write strategy logic levels at 1116 and 1118, HIGH write strategy logic levels at 1112 and a cool-down, or laser off, light irradiation level at 1114. One goal of a write strategy code design is to overcome physical characteristics of the optical media. First turret 1104 is used to overcome reflective properties of the optical media and to provide a crisp start to the pit or groove to be etched into the optical laser media. Second turret 1106 is used to provide a crisp end to the pit or groove to be etched into the optical laser media. Cool-down, or laser off, light irradiation level at 1114 is provided to allow the laser diode to cool after use, so as to avoid long term heat build-up in the laser diode. The HIGH write strategy logic levels at 1112 correspond to a HIGH logic level in the run-length code used to generate the write strategy code. Therefore, the duration of the HIGH write strategy logic levels at 1112 is determined, at least in part, by the number of consecutive HIGH logic values included in the run-length code.

Figure 12:
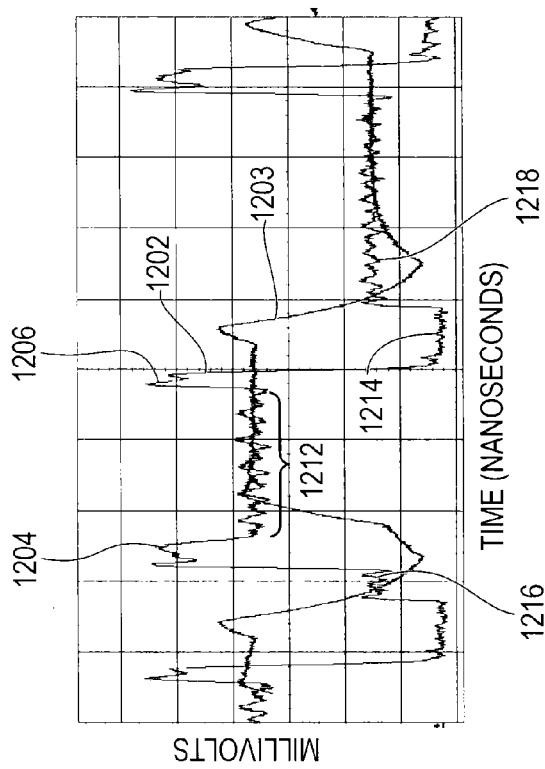
FIG. 12 shows a plot of a forward sense diode feedback signal and a plot of the laser write strategy castle waveform that generated the sense diode feedback signal on a common time axis.

FIG. 12 shows an example plot of a forward sense diode feedback signal 1203 and a plot of the laser write strategy castle waveform 1202 that generated the sense diode feedback signal 1203, the two plots shown on a common time axis. Features in laser write strategy castle waveform 1202 corresponding to features identified in the idealized laser write strategy castle waveform 1102, are shown. For example, a first turret 1204, a second turret 1206, a cool-down level at 1214, LOW write strategy logic levels at 1216 and 1218, and HIGH write strategy logic levels at 1212 are shown. Note that the forward sense diode feedback signal 1203 is delayed in time relative to the write strategy castle waveform 1202 that drove the laser diode, the light output of which resulted in the forward sense diode feedback signal 1203. The delay shown corresponds to synchronous and asynchronous delays which must be accounted for by a synchronous sampling signal if the forward sense diode feedback signal is to be sampled at a location that provides relevant power levels for use in performing forward sense calibration of write laser power.

Figure 13:
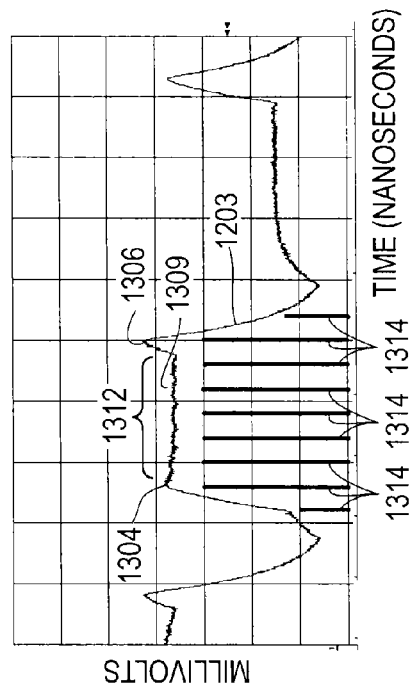
FIG. 13 shows a plot of a forward sense diode feedback signal on a common time axis with an example plot of convolution data generated for the forward sense diode feedback signal using the approach described with respect to FIG. 5.

FIG. 13 shows an example detail plot of the forward sense diode feedback signal 1203 shown in FIG. 12. As shown in FIG. 13, the sense diode feedback signal 1203 has features which correlate to feature of the write strategy castle waveform 1202. Specifically, forward sense diode feedback signal 1203 includes a first turret 1304, a second turret 1306, and HIGH write strategy logic levels at 1312 that may provide multiple sample points 1309. Also shown in FIG. 13 at 1314 is output typical of the incremental sample-based convolution process described above with respect to FIG. 5. As shown in FIG. 13, such convolution data does not match the magnitude of forward sense diode feedback signal 1203 but the convolution data does follow the basic waveform shape and, therefore, may be aligned with a write strategy code segment waveform to determine a block delay, as described above with respect to FIG. 6 at S616 to S620.

Figure 14:
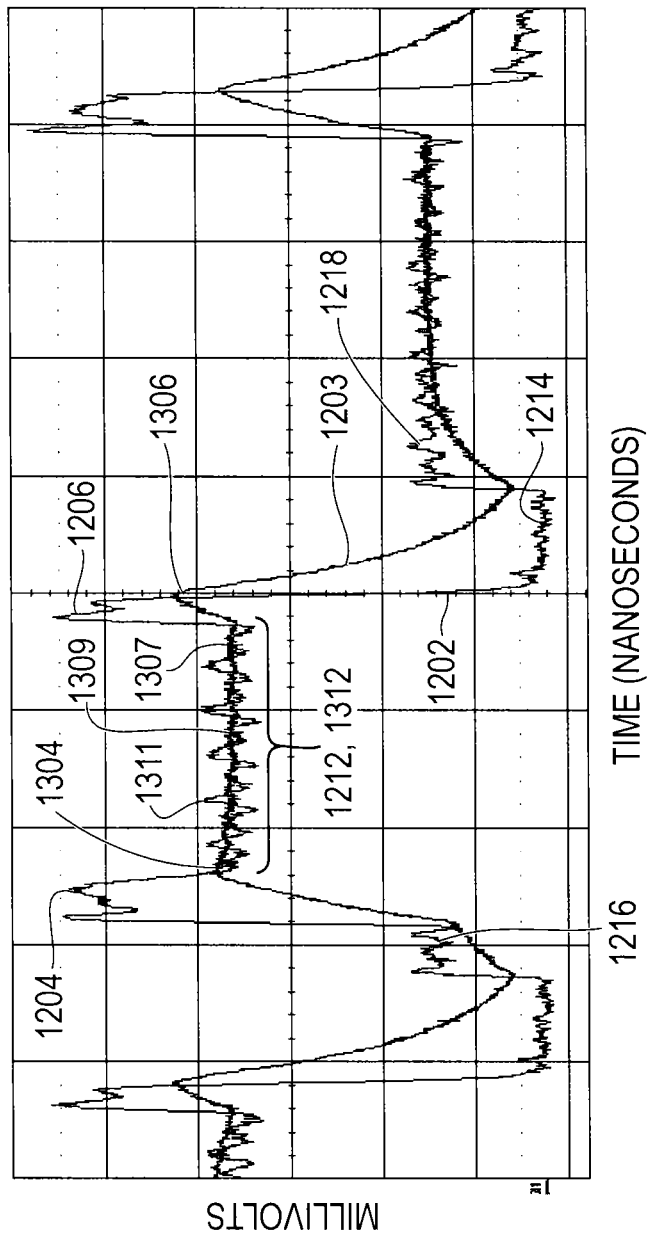
FIG. 14 shows a plot of the forward sense diode feedback signal and the plot of the laser write strategy castle waveform of FIG. 12, in which corresponding features have been aligned.

FIG. 14 shows a plot of the forward sense diode feedback signal and the plot of the laser write strategy castle waveform of FIG. 12, in which corresponding features have been aligned based on a determine block delay determined using the process described above with respect to FIG. 6 and FIG. 7. Features introduced in FIG. 13 and FIG. 14 have been identically labeled in FIG. 14 and will not again be introduced. A first safe sample point 1307, a second safe sample point 1309, and a third safe sample point 1311 are indicated in FIG. 14 within the newly aligned portions of HIGH write strategy logic level 1312 and HIGH write strategy logic levels at 1212.

Figure 15:
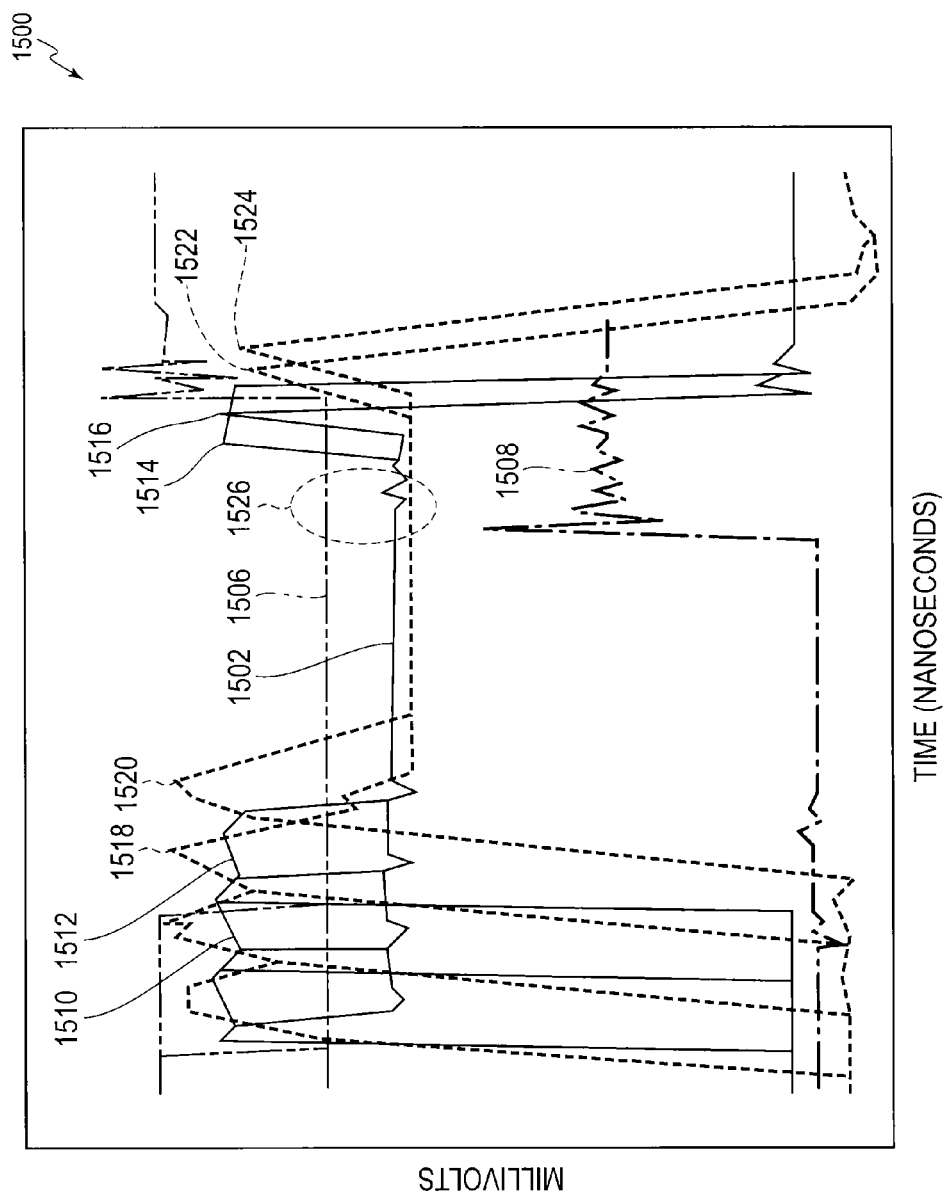
FIG. 15 shows a plot of a forward sense diode feedback signal, an example plot of the laser write strategy castle waveform that generated the forward sense diode feedback signal, an example plot of a write strobe signal, and an example plot of a sampling strobe signal.

FIG. 15 shows a plot of a forward sense diode feedback signal 1504, a plot of the laser write strategy castle waveform 1502 that generated the forward sense diode feedback signal 1504, a plot of a write strobe signal 1506, and a plot of a sampling strobe signal 1508. As shown in FIG. 15, forward sense diode feedback signal 1504 with first turrets shown at 1518/1520 and second turrets shown at 1522/1524 is delayed in time relative to the laser write strategy castle waveform 1502, with first turrets shown at 1510/1512 and second turrets shown at 1514/1516, that generated the forward sense diode feedback signal 1504. As further shown in FIG. 15, a sample value based on sampling strobe signal 1508 would result in an inaccurate sample value due to the inclusion of elevated turret values. Such an inaccurate sample value, if used to support forward sense calibration of write laser power would result in erroneous changes in the laser power output.

Figure 16:
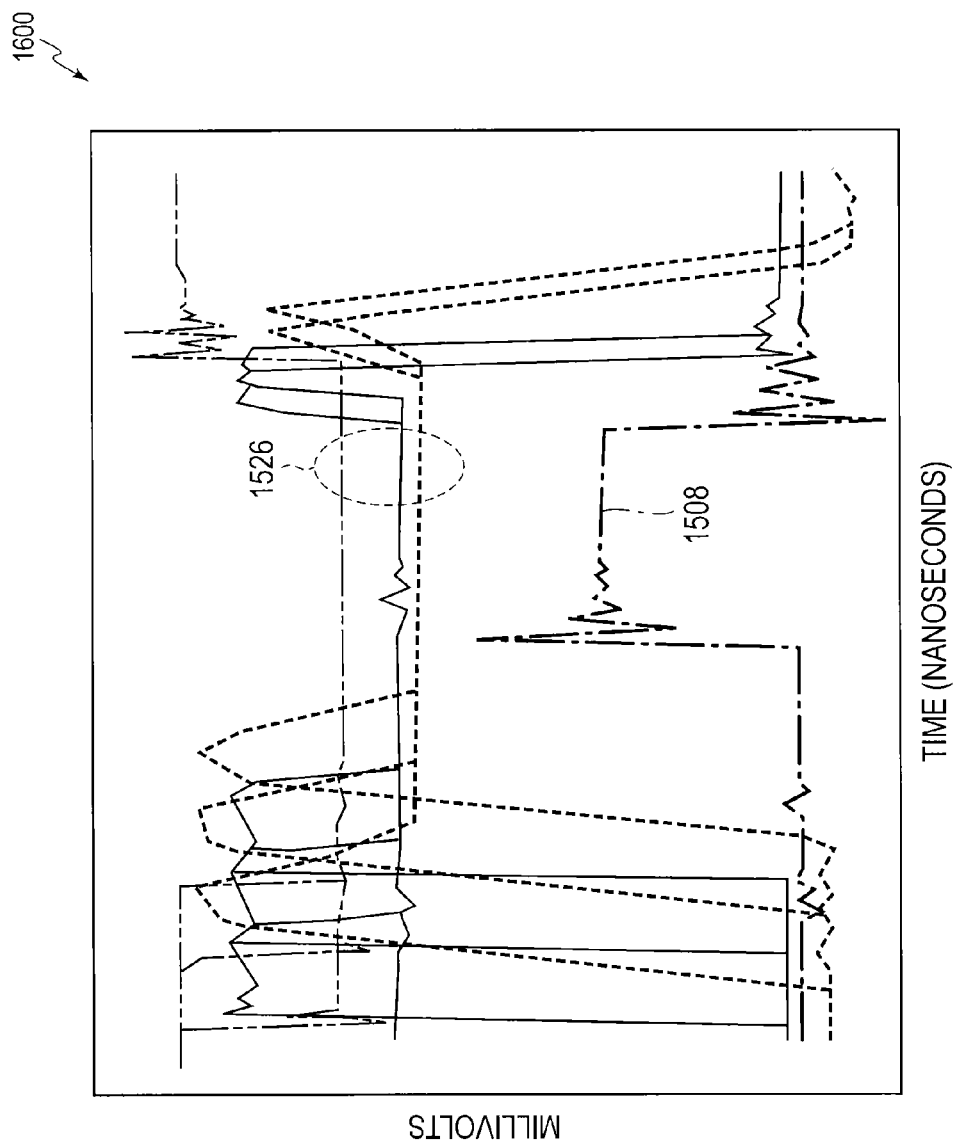
FIG. 16 shows the signal plots presented in FIG. 15, in which the sampling strobe signal has been shifted in time to align with a safe sampling area of the forward sense diode feedback signal.

FIG. 16 shows the signal plots presented in FIG. 15, in which the sampling strobe signal has been shifted in time to align with a safe sampling area 1526 of the forward sense diode feedback signal. As further shown in FIG. 16, a sample value based on sampling strobe signal 1508 would result in an accurate sample value due to the exclusion of elevated turret values. Such an accurate sample value, if used to support forward sense calibration of write laser power would result in proper corrections to the laser power output.

Figure 17:
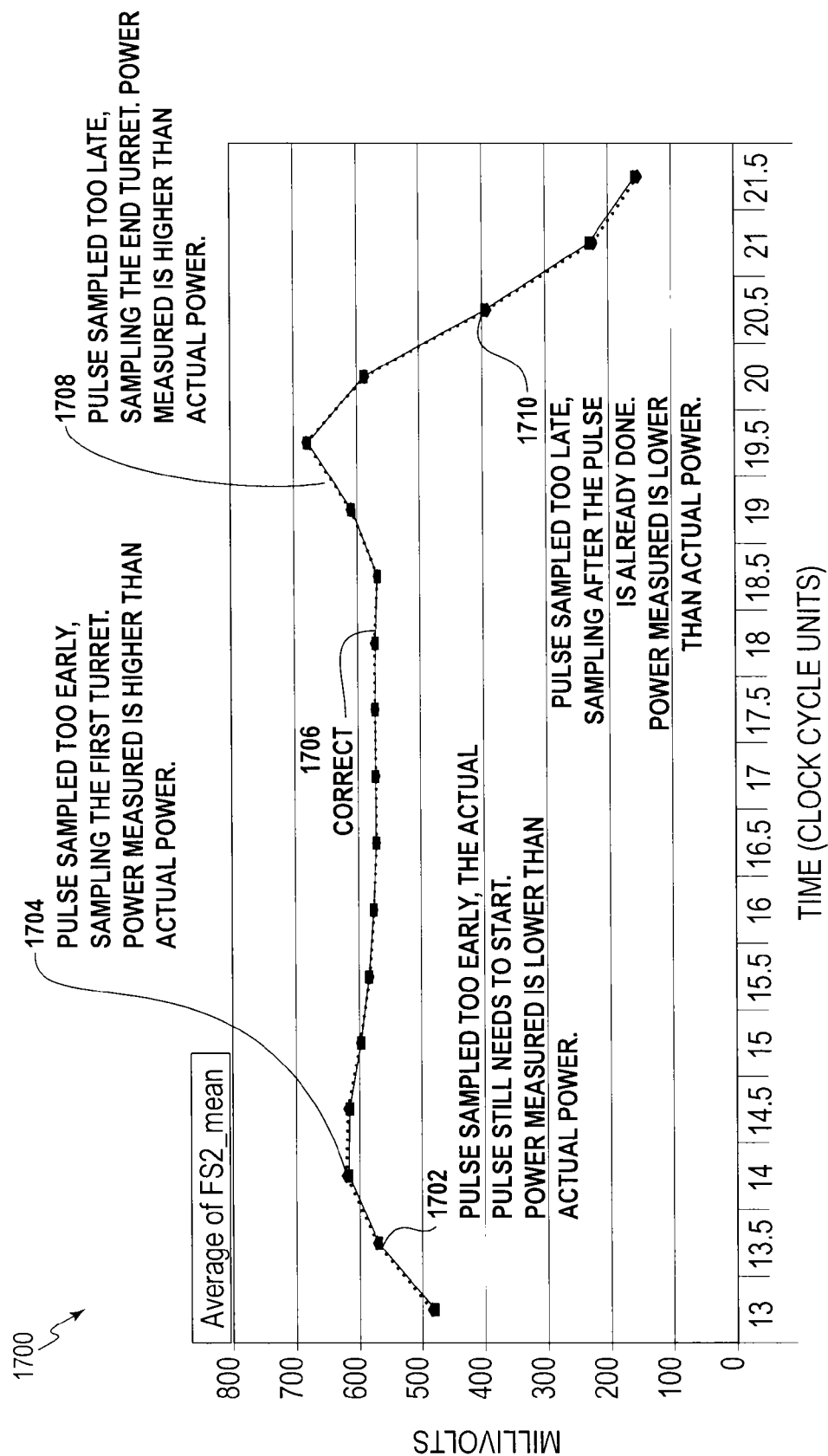
FIG. 17 shows a plot of a forward sense diode feedback signal in which portions of the signal are identified with respect to their suitability for use in supporting forward sense calibration of write laser power.

FIG. 17 shows a plot 1700 of a forward sense diode feedback signal in which portions of the signal are identified with respect to their suitability for use in supporting forward sense calibration of write laser power. As shown in FIG. 17, sampling on the rising portion of the forward sense diode feedback signal at 1702, or the falling portion of the forward sense diode feedback signal at 1710 results in a sample value that is too low. Sampling on the first turret at 1704 or on the second turret 1708 results in a sample value that is too high. However, sampling in the flat, stable zone at 1706 results in a reliable sample of the write strategy HIGH power level.

Figure 18:
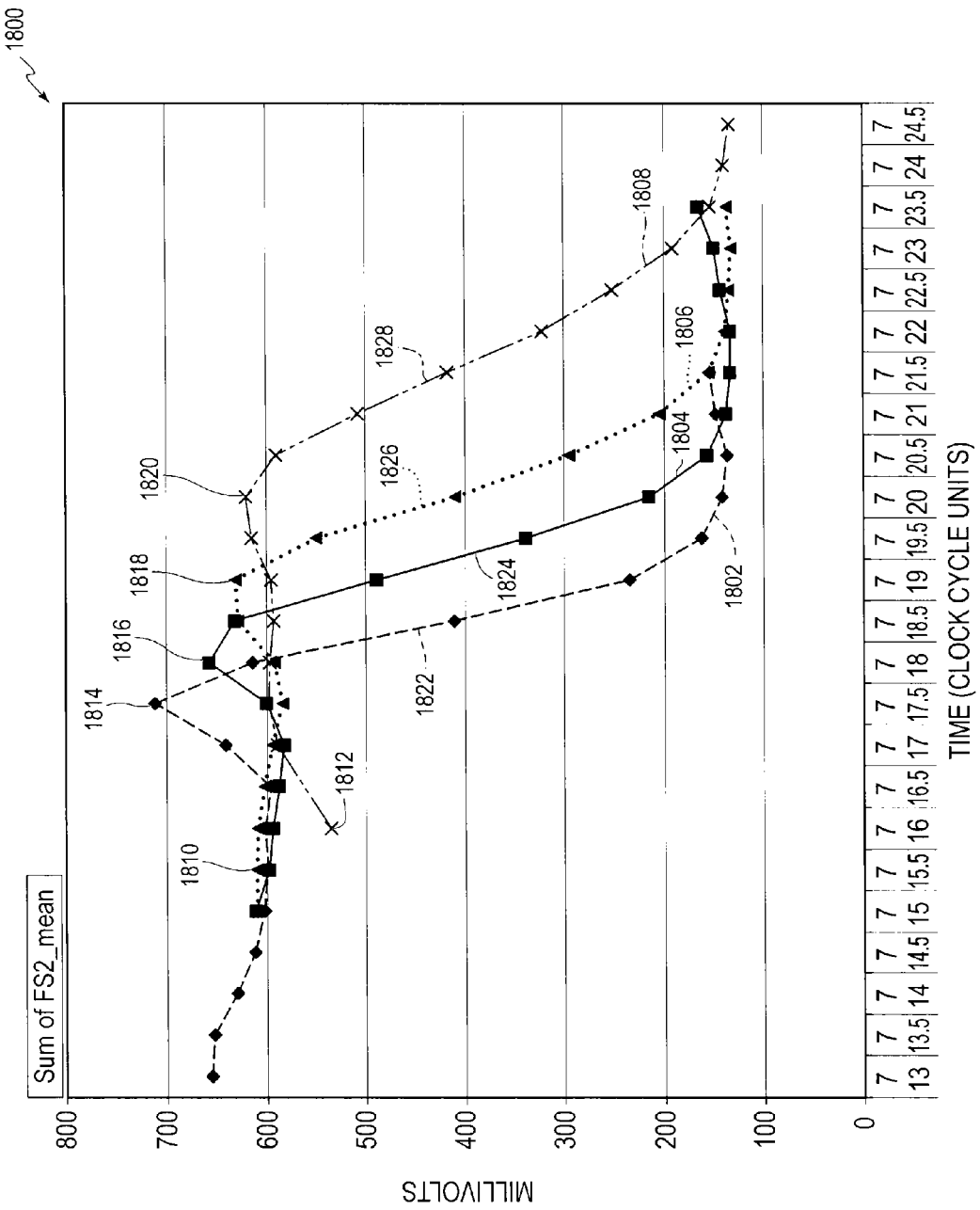
FIG. 18 shows plots of the trailing castle tower portions of example forward sense diode feedback signals generated by laser write strategy castle waveform operating at different write speeds.

FIG. 18 shows plots 1800 of the trailing castle tower portions of forward sense diode feedback signals generated by laser write strategy castle waveform operating at different write speeds. For example, forward sense diode feedback signal 1802 is based on a laser write strategy operating at a first write speed, forward sense diode feedback signal 1804 is based on a laser write strategy operating at a second write speed that is faster than the first write speed, forward sense diode feedback signal 1806 is based on a laser write strategy operating at a third write speed that is faster than the second write speed, and forward sense diode feedback signal 1808 is based on a laser write strategy operating at a fourth write speed that is faster than the third write speed. As shown in FIG. 18, the magnitude of the second turret decreases as a result of increasing the respective write speeds. For example, the magnitude of second turret 1820 of forward sense diode feedback signal 1808 with the highest write speed has a maximum second turret value that is the lowest; the magnitude of second turret 1818 of forward sense diode feedback signal 1806 with the next highest write speed has a maximum second turret value that is the lower than forward sense diode feedback signal 1808; the magnitude of second turret 1816 of forward sense diode feedback signal 1804 with the next second lowest write speed has a maximum second turret value that is the second lowest, and lower than the second turret value 1818 of forward sense diode feedback signal 1806; and the magnitude of second turret 1814 of forward sense diode feedback signal 1802 with the lowest write speed has a maximum second turret value that is the lowest of all other signal presented. As further shown in FIG. 1800, each of the forward sense diode feedback signal can be safely sampled at location 1810 to provide an accurate write strategy HIGH laser power sample.

Figure 19:
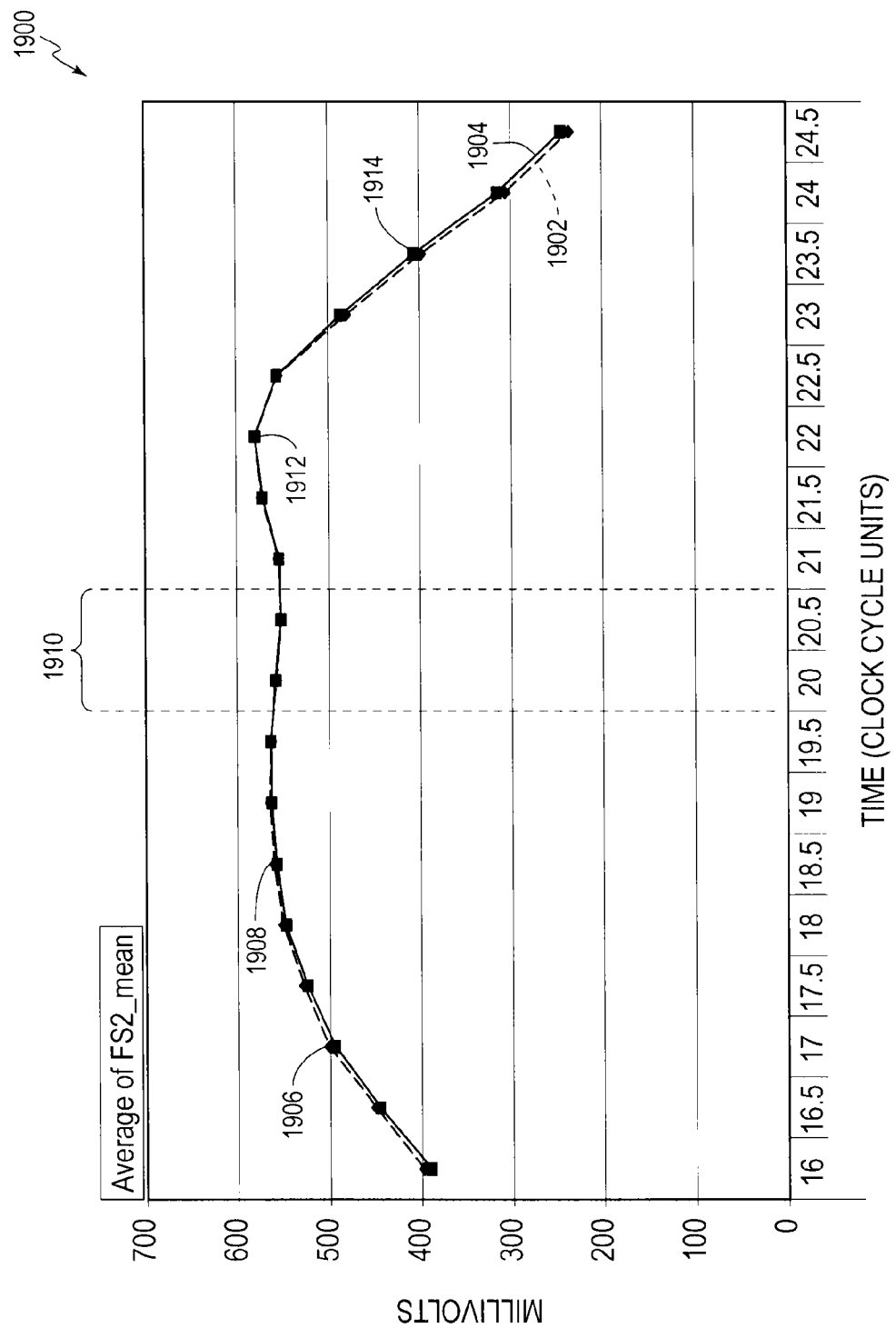
FIG. 19 shows a plot of a forward sense diode feedback signal generated by a write strategy castle waveform with a known pulse length.
Figure 20:
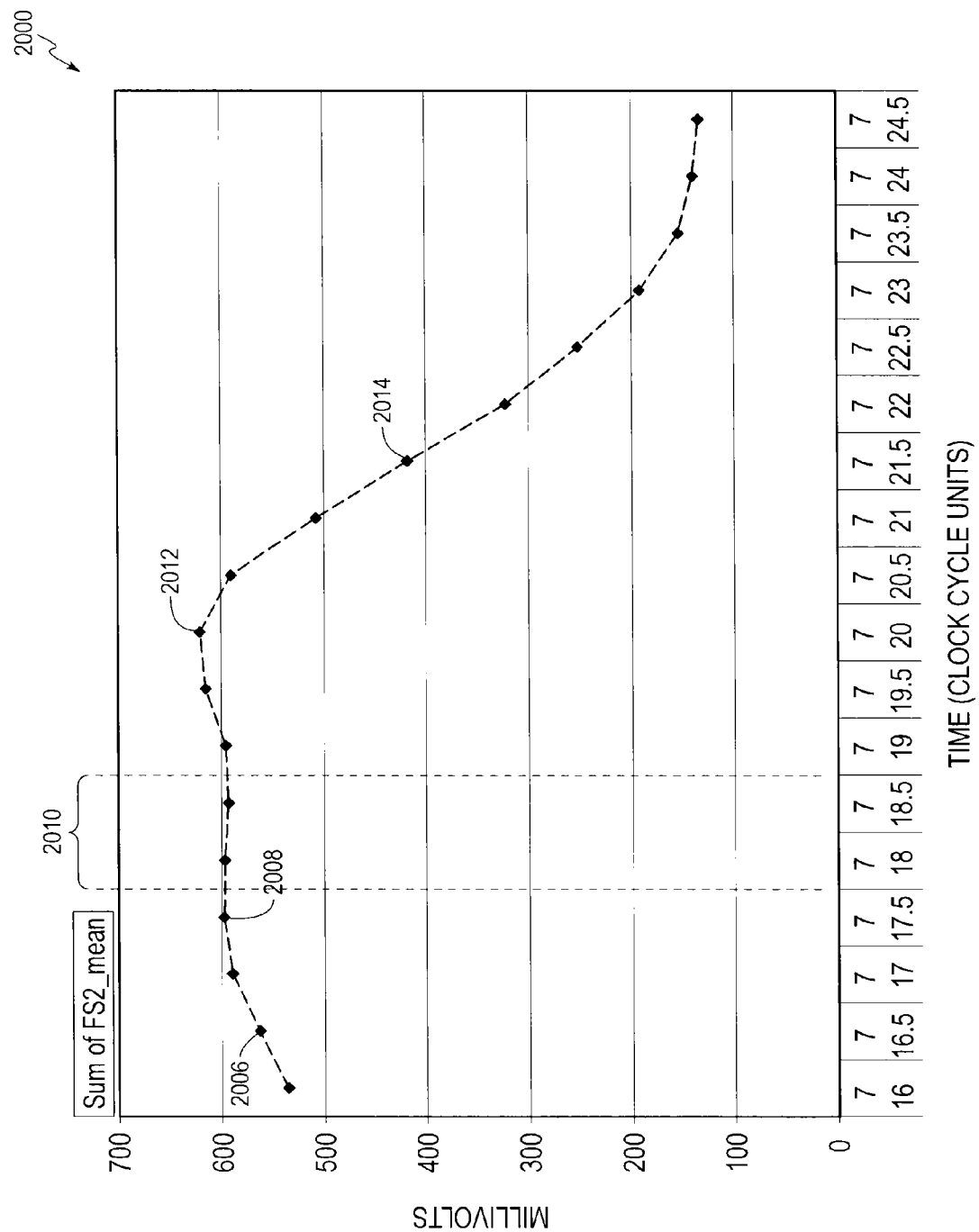
FIG. 20 shows a plot of a forward sense diode feedback signal generated by a write strategy castle waveform using the same write strategy configuration of FIG. 19, but with a write strategy segment length that has been shortened by 2 clock cycles.
Figure 21:
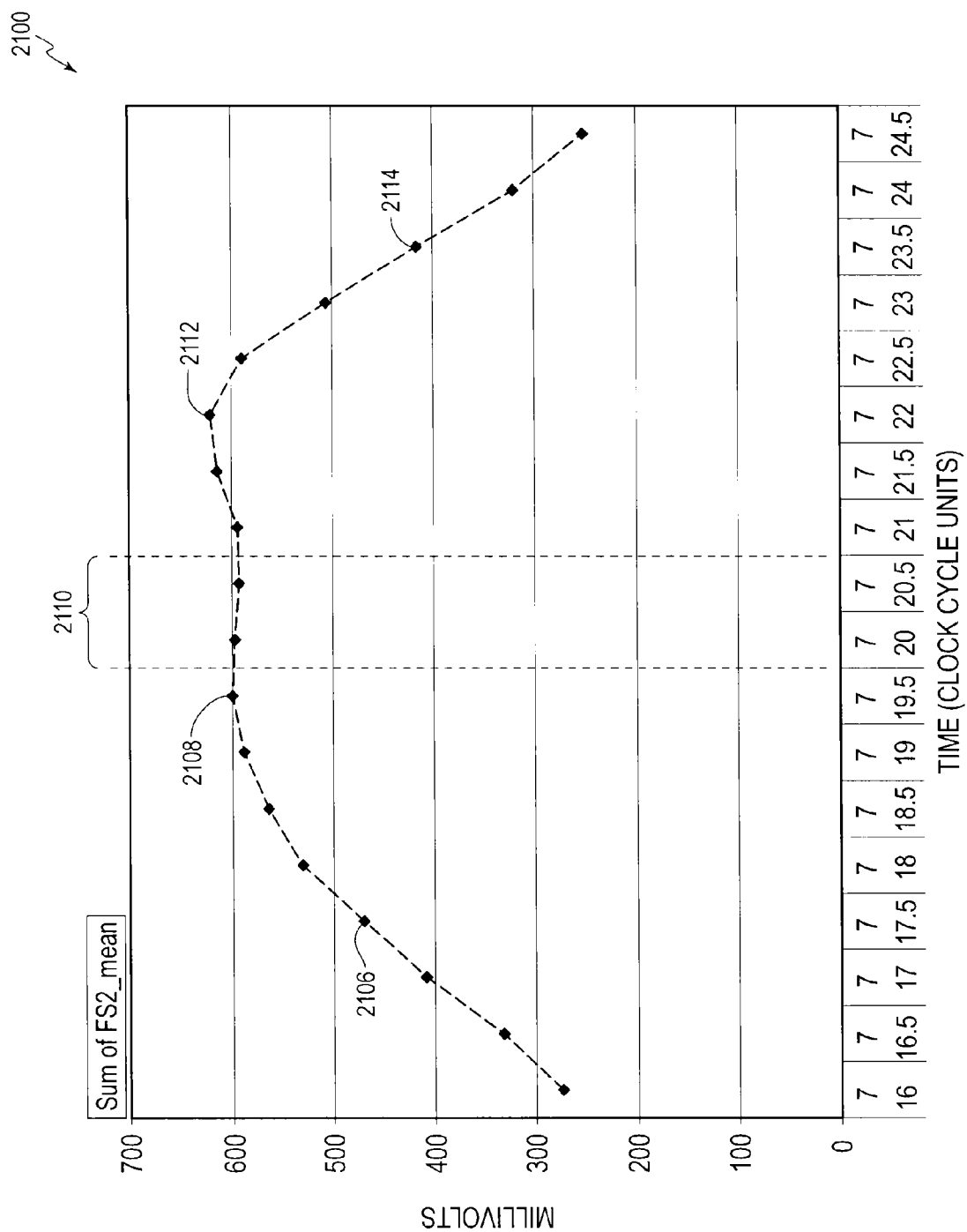
FIG. 21 shows a plot of a forward sense diode feedback signal generated by a write strategy castle waveform using the same write strategy configuration of FIG. 19, the forward sense diode feedback signal adjusted in time for synchronous and asynchronous delays.

FIG. 19 shows a plot of a forward sense diode feedback signal generated by a write strategy castle waveform with a known pulse length. FIG. 20 shows a plot of a forward sense diode feedback signal generated by a write strategy castle waveform using the same write strategy configuration of FIG. 19, but with a write strategy segment length that is 2 clock cycles shorter. FIG. 21 shows a plot of a forward sense diode feedback signal generated by a write strategy castle waveform using the same write strategy configuration of FIG. 19, the forward sense diode feedback signal adjusted in time for synchronous and asynchronous delays.

FIG. 19 includes a rising portion of the forward sense diode feedback signal at 1906, a falling portion of the forward sense diode feedback signal at 1914, a first turret at 1908, a second turret at 1912, and a preferred sample zone just prior to the second turret at 1910. Similarly, FIG. 20 includes a rising portion of the forward sense diode feedback signal at 2006, a falling portion of the forward sense diode feedback signal at 2014, a first turret at 2008, a second turret at 2012, and a preferred sample zone just prior to the second turret at 2010. In addition, FIG. 21 includes a rising portion of the forward sense diode feedback signal at 2106, a falling portion of the forward sense diode feedback signal at 2114, a first turret at 2108, a second turret at 2112, and a preferred sample zone just prior to the second turret at 2110.

A comparison of the plot in FIG. 20 with a plot of FIG. 19 reveals that shortening the write strategy segment length by 2 clock cycles has the effect of shifting the preferred sample zone 2010 back by exactly 2 clock cycles, which indicates that the synchronous and asynchronous delays, i.e., the block delay, associated with the two plots has remained the same. A comparison of the plot FIG. 21 to FIG. 19 shows that once a block delay associated with a write strategy configuration is applied to a forward sense diode feedback signal, a safe sample zone within the forward sense diode feedback signal can be consistently defined in terms of an offset from the end of the write strategy segment.

Figure 22:
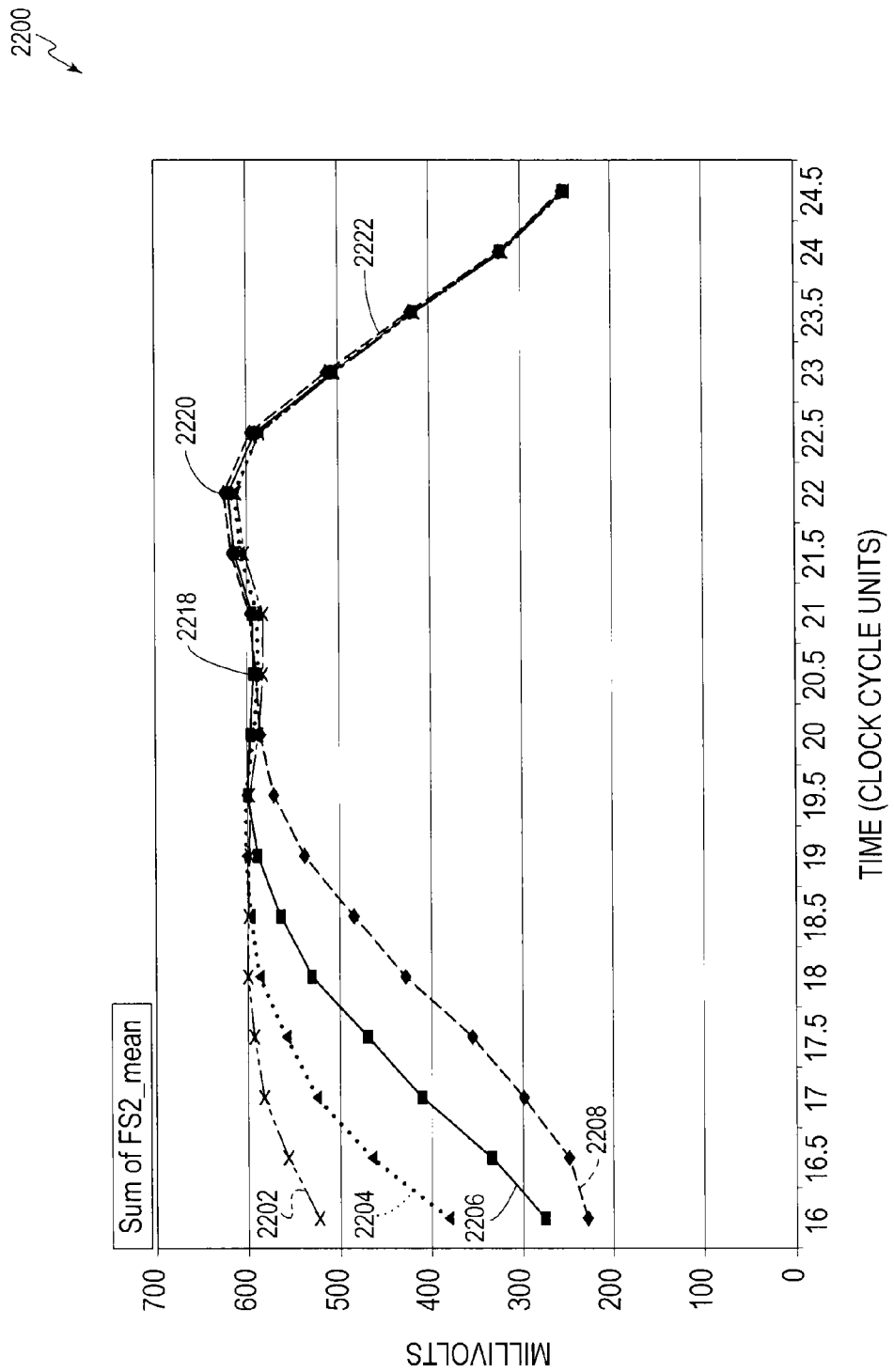
FIG. 22 shows plots of forward sense diode feedback signals generated using a common write strategy configuration at a first write speed, each forward sense diode feedback signal having a different pulse run-length.
Figure 23:
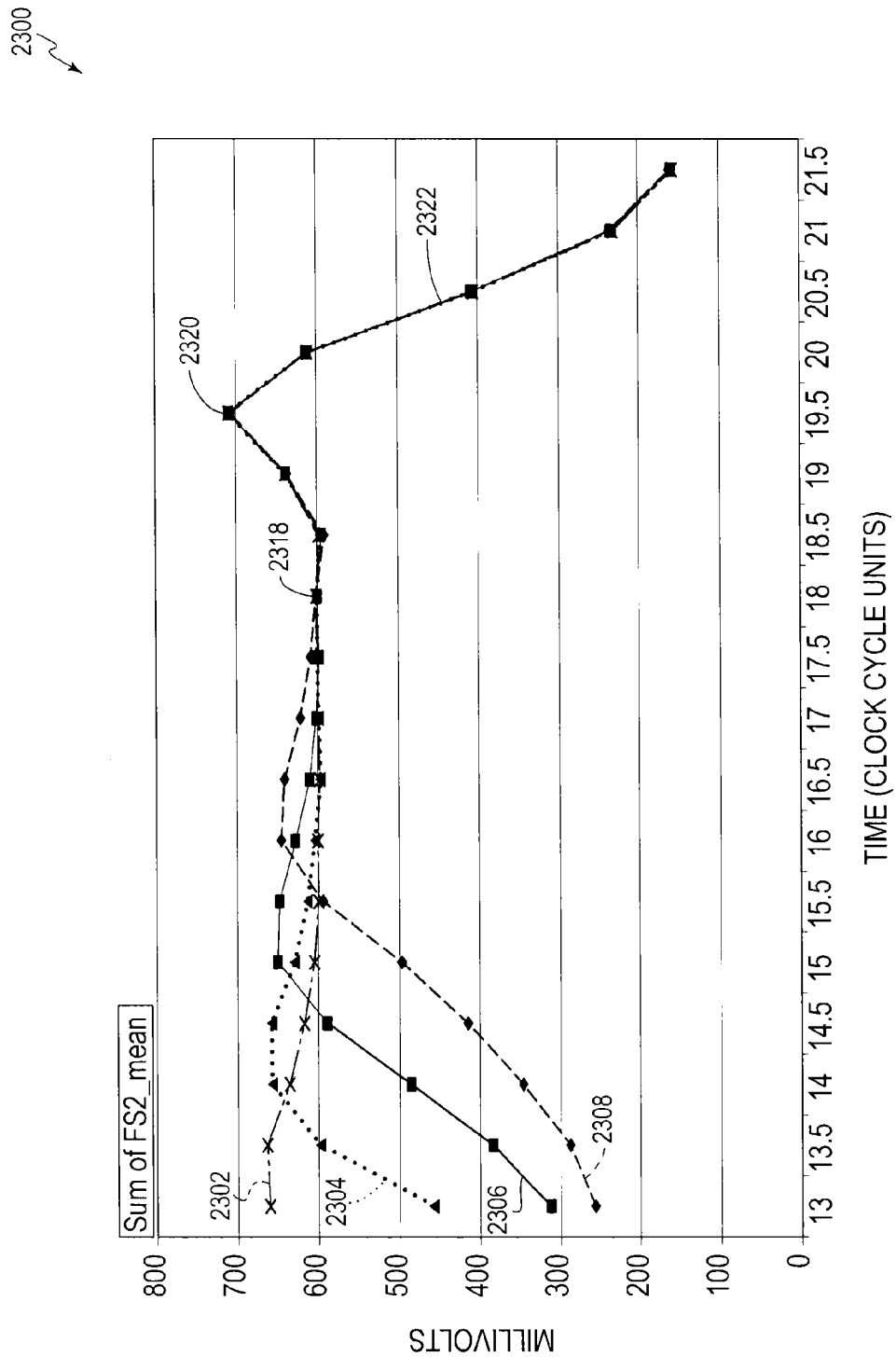
FIG. 23 shows plots of forward sense diode feedback signals generated using the same common write strategy configuration used in FIG. 22, but at an increased write speed, each forward sense diode feedback signal having a different pulse run-length.

FIG. 22 shows plots of forward sense diode feedback signals generated using a common write strategy configuration at a first write speed, each with a different pulse run-length. FIG. 23 shows plots of forward sense diode feedback signals generated using the common write strategy configuration of FIG. 22 with an increased write speed, each with a different pulse run-length. As shown in FIG. 22 and FIG. 23, changing the length of the write strategy segment run-length significantly reduces the length of the safe sampling area. However, the portion of the waveforms just prior to the second turret remain the most stable, i.e., least affected by the turret distortion. For example, plot 2202, plot 2204, plot 2206 and plot 2208 vary significantly with respect to the location of the respective rising portions and the respective first turrets of the waveforms. However the waveforms become consistent at a common position 2218 just before the second turret and remain consistent at the second turret 2220 and at a falling portion of the forward sense diode feedback signal at 2222. Similarly, plot 2302, plot 2304, plot 2306 and plot 2308 vary significantly with respect to the location of the respective rising portions and the respective first turrets of the waveforms. However the waveforms become consistent at a common position 2318 just before the second turret and remain consistent at the second turret 2320 and at a falling portion of the forward sense diode feedback signal at 2322.

Based on the plots presented in FIG. 22 and FIG. 23, a minimum pulse width that may be used by location module 304 of strategy module 110 may be set to approximately 6 to 8 clock cycles for a castle waveform based write strategy in the optical disc drive used to generate the plots shown in FIG. 22 and FIG. 23. As shown in FIG. 22 and FIG. 23, in plots with a minimum pulse width less than 6 to 8 clock cycles, the respective first and second turrets begin to overlap, thereby effectively eliminating the safe sampling zone shown just prior to the second turret in the plots with a minimum pulse width that is 6 to 8 clock cycles or greater. However, the minimum pulse width for other optical disc drives using other components may be different.

It is noted that the length of a required minimum pulse width is dependent on the speed of components included within a specific optical disc drive embodiment, e.g., a speed of the forward sense diode, sample-and-hold characteristics, etc. As optical disc drive write speeds increase, the asynchronous delays associated with a specific optical disc drive embodiment may make it impossible to achieve a horizontal, or safe, sampling zone within a monitored feedback signal. In such embodiments, the minimum pulse width described above with respect to FIG. 22 and FIG. 23 approaches zero, and the portion of the forward sense diode feedback signal will likely be rising or falling, rather than stable. Nevertheless, so long as control loop module 414 of laser power control module 112, e.g., as described above with respect to FIG. 4, is provided with an expected magnitude of the feedback signal at the sampling point, e.g., a sampling point determined as described above based on the use of predetermined sampling delays and the write strategy data that generated the feedback signal, the above described approach is still effective, even if the sampling point is associated with a rising, or falling, portion of the feedback signal, so long as the feedback signal is consistent at the chosen sampling point and variations in the feedback signal at the sampling point are due to fluctuations in the laser output that the laser power feedback loop is intended to control.

It is noted that the modules described above with respect to example optical disc drive embodiments, and the function each module performs, may be implemented in any manner and may be integrated within and/or distributed across any number of modules in any manner. For example, such modules may be implemented in an example optical disc drive embodiment using any combination of hardware, including application specific integrated circuits, microprocessors, systems on a chip, other specialized hardware, software and/or firmware and/or combination thereof.

For purposes of explanation in the above description, numerous specific details are set forth in order to provide a thorough understanding of the described embodiments of an optical disc drive that performs automatic forward sense calibration of write laser power using a sample and hold sampling strategy that is automatically determined based on an automatically selected write strategy. It will be apparent, however, to one skilled in the art based on the disclosure and teachings provided herein that the described embodiments may be practiced without these specific details. In other instances, well-known structures and devices are shown in block diagram form in order to avoid obscuring the features of the described embodiments.

While the embodiments of an efficient approach for an optical disc drive that performs automatic forward sense calibration of write laser power using a sample and hold sampling strategy that is automatically determined based on an automatically selected write strategy has been described in conjunction with the specific embodiments thereof, it is evident that many alternatives, modifications, and variations will be apparent to those skilled in the art. Accordingly, the described embodiments, as set forth herein, are intended to be illustrative, not limiting. There are changes that may be made without departing from the spirit and scope of the invention.

What is claimed is:
1. A storage drive, comprising:
an encoder module configured to generate encoded run-length data;
a strategy module configured to generate write strategy data based on the encoded run-length data, the write strategy data including a write strategy power level corresponding to a logic level represented in the encoded run-length data, and configured to generate a synchronous sampling signal; and
a power control module configured to sample a feedback signal based on the synchronous sampling signal and configured to control a drive power level based on the sampled feedback signal,
wherein a sampling point within the synchronous sampling signal is based on a last clock cycle associated with a generated write strategy signal pulse and one or more predetermined delays.
2. The storage drive of claim 1, wherein the write strategy data is a castle waveform.

3. The storage drive of claim 1, wherein the sampling point corresponds to a location in the feedback signal between a first turret and a second turret.

4. The storage drive of claim 3, wherein the sampling point corresponds to a location in the feedback that is closer to the second turret than the first turret.

5. The storage drive of claim 1, wherein the strategy module is further configured to retrieve the one or more predetermined delays from a data store based in part on a type of the write strategy data.

6. The storage drive of claim 1, further comprising:
a locator module configured to determine a length of a write strategy power level within a write strategy segment.

7. The storage drive of claim 6, wherein the one or more predetermined delays include a block delay that provides a delay from an end of the write strategy segment.

8. The storage drive of claim 6, wherein the one or more predetermined delays include a block delay that provides a delay from an end of the write strategy segment and an offset delay that extends the block delay.

9. The storage drive of claim 6, wherein the locator module is further configured to allow the synchronous sampling signal to include a sampling point for the write strategy power level if the determined length of the write strategy power level exceeds a predetermined minimum.

10. The storage drive of claim 1, wherein the drive power level is based on a laser power.

11. A method of performing forward sense calibration of write power in a storage drive, comprising:
generating encoded run-length data;
generating write strategy data based on the encoded run-length data, the write strategy data including a write strategy power level corresponding to a logic level represented in the encoded run-length data;
generating a synchronous sampling signal that includes a sampling point based on a last clock cycle associated with a generated write strategy signal pulse and one or more predetermined delays;
sampling a feedback signal based on the synchronous sampling signal to produce sampled feedback signal values; and
controlling a drive power level based on the sampled feedback signal values.

12. The method of claim 11, wherein generating write strategy data generates the write strategy data that is a castle waveform.

13. The method of claim 11, further comprising:
generating the sampling point corresponding to a location in the feedback signal between a first turret and a second turret.

14. The method of claim 13, wherein the sampling point corresponds to the location in the feedback that is closer to the second turret than the first turret.

15. The method of claim 11, further comprising:
retrieving the one or more predetermined delays from a data store based in part on knowledge that the write strategy data is a castle waveform.

16. The method of claim 11, further comprising:
determining a length of a write strategy power level within a write strategy segment.

17. The method of claim 16, further comprising:
setting a sampling point in the synchronous sampling signal for the write strategy segment if the determined length of the write strategy power level exceeds a predetermined minimum.

18. The method of claim 16, wherein the one or more predetermined delays include a block delay that provides a delay from an end of the write strategy segment.

19. The method of claim 16, wherein the one or more predetermined delays include a block delay that provides a delay from an end of the write strategy segment and an offset delay that extends the block delay.

20. The method of claim 11, wherein the drive power level is based on a laser power.

* * * * *